United States Patent
Kumagai et al.

(10) Patent No.: US 9,141,202 B2
(45) Date of Patent: Sep. 22, 2015

(54) INFORMATION PROCESSING APPARATUS, INPUT APPARATUS, INFORMATION PROCESSING SYSTEM, INFORMATION PROCESSING METHOD, AND PROGRAM

(75) Inventors: Hideaki Kumagai, Tokyo (JP); Takashi Yamada, Tokyo (JP); Katsuhiko Yamada, Tokyo (JP); Kazuyuki Yamamoto, Tokyo (JP); Hidetoshi Kabasawa, Tokyo (JP); Toshio Mamiya, Tokyo (JP)

(73) Assignee: Sony Corporation, Tokyo (JP)

( * ) Notice: Subject to any disclaimer, the term of this patent is extended or adjusted under 35 U.S.C. 154(b) by 1233 days.

(21) Appl. No.: 12/517,505

(22) PCT Filed: Jun. 6, 2008

(86) PCT No.: PCT/JP2008/060489
§ 371 (c)(1),
(2), (4) Date: Jun. 3, 2009

(87) PCT Pub. No.: WO2008/149991
PCT Pub. Date: Dec. 11, 2008

(65) Prior Publication Data
US 2010/0039382 A1 Feb. 18, 2010

(30) Foreign Application Priority Data
Jun. 8, 2007 (JP) .................. 2007-152592

(51) Int. Cl.
*G06F 3/033* (2013.01)
*G06F 3/0346* (2013.01)
(Continued)

(52) U.S. Cl.
CPC .............. *G06F 3/0346* (2013.01); *G06F 3/038* (2013.01); *G06F 3/04812* (2013.01)

(58) Field of Classification Search
CPC .......... G06F 3/013; G06F 2203/04802; G06F 3/012; G06F 3/0346; G06F 3/0304; G06F 3/038; G06F 3/04812

USPC ............................ 345/157–158; 715/821–822
See application file for complete search history.

(56) References Cited

U.S. PATENT DOCUMENTS

| 5,554,980 A | * | 9/1996 | Hashimoto et al. ........... 345/158 |
| 5,564,004 A | * | 10/1996 | Grossman et al. ............ 715/835 |

(Continued)

FOREIGN PATENT DOCUMENTS

| JP | 07-085303 | 3/1995 |
| JP | 07-036243 | 7/1995 |

(Continued)

OTHER PUBLICATIONS

International Search Report dated Jul. 1, 2008, for corresponding Patent Application PCT/JP2008/060489.

*Primary Examiner* — Towfiq Elahi
*Assistant Examiner* — William Boddie
(74) *Attorney, Agent, or Firm* — K&L Gates LLP

(57) ABSTRACT

An information processing apparatus, an input apparatus, an information processing system, an information processing method, and a program that are capable of improving operability when a target object is selected on a screen are provided. A control apparatus is provided to which, when a button is pressed in a state where a pointer is indicating an area around an icon on a screen, a signal indicating that the button has been pressed and a signal of positional information of the pointer at that time are input, and the control apparatus performs movement control such that the pointer indicates the icon based on those signals. Therefore, even when the pointer is not directly indicating the icon, the icon can be indicated by indicating the area around the icon, thus improving operability in selecting the icon on the screen by the pointer.

23 Claims, 30 Drawing Sheets

(51) Int. Cl.
*G06F 3/038* (2013.01)
*G06F 3/0481* (2013.01)

(56) References Cited

U.S. PATENT DOCUMENTS

| | | | |
|---|---|---|---|
| 5,736,974 A * | 4/1998 | Selker | 715/862 |
| 5,905,497 A * | 5/1999 | Vaughan et al. | 345/672 |
| 6,037,933 A * | 3/2000 | Blonstein et al. | 715/721 |
| 6,724,368 B2 * | 4/2004 | Strubbe | 345/158 |
| 2002/0003528 A1 * | 1/2002 | Rosenberg et al. | 345/157 |
| 2003/0128187 A1 * | 7/2003 | Strubbe | 345/157 |
| 2006/0146022 A1 * | 7/2006 | Lin et al. | 345/163 |
| 2006/0174568 A1 * | 8/2006 | Kinoshita et al. | 52/395 |
| 2007/0066394 A1 * | 3/2007 | Ikeda et al. | 463/37 |

FOREIGN PATENT DOCUMENTS

| | | |
|---|---|---|
| JP | 08-016353 | 1/1996 |
| JP | 2005-513834 | 5/2005 |

* cited by examiner

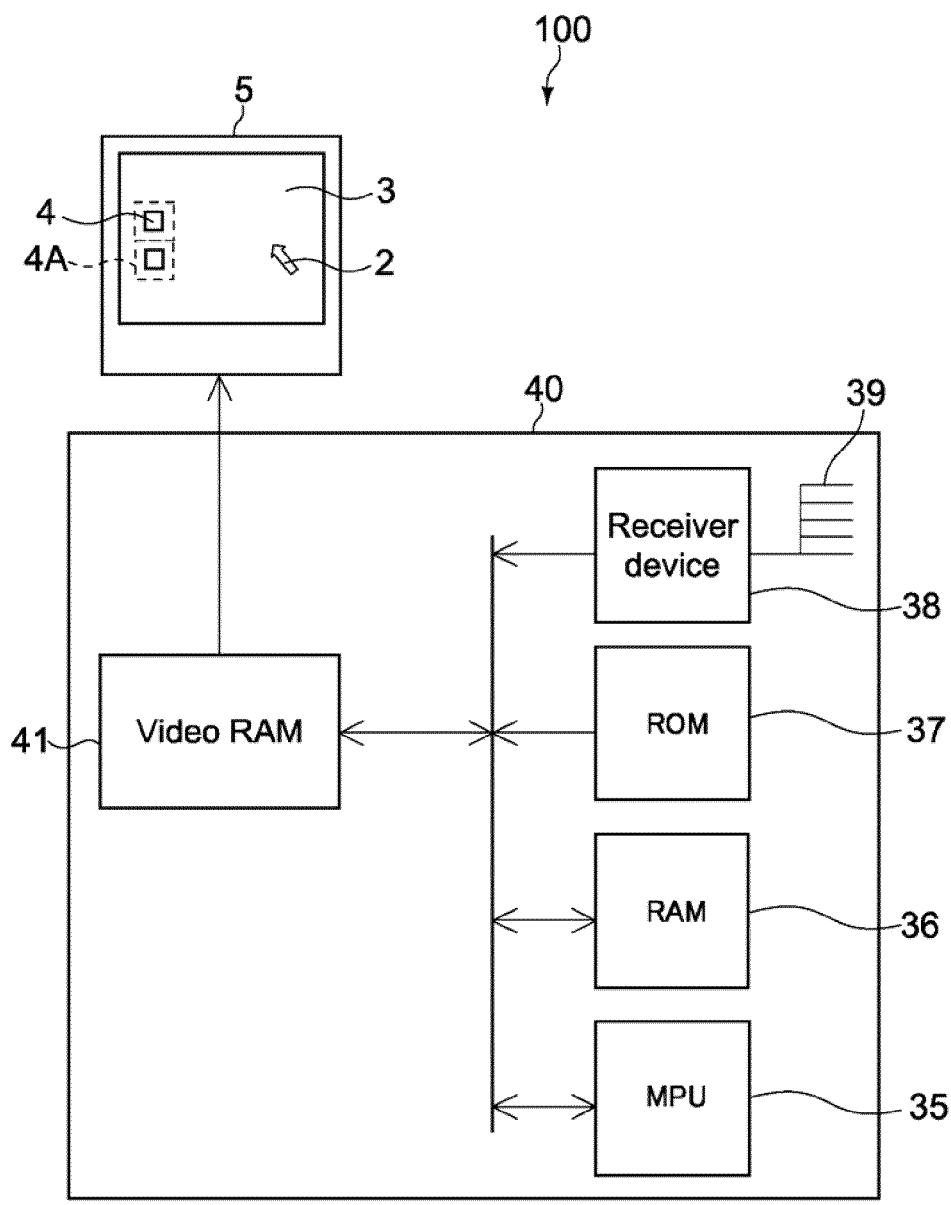
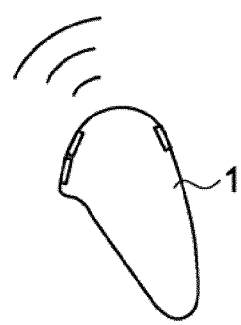
FIG.1

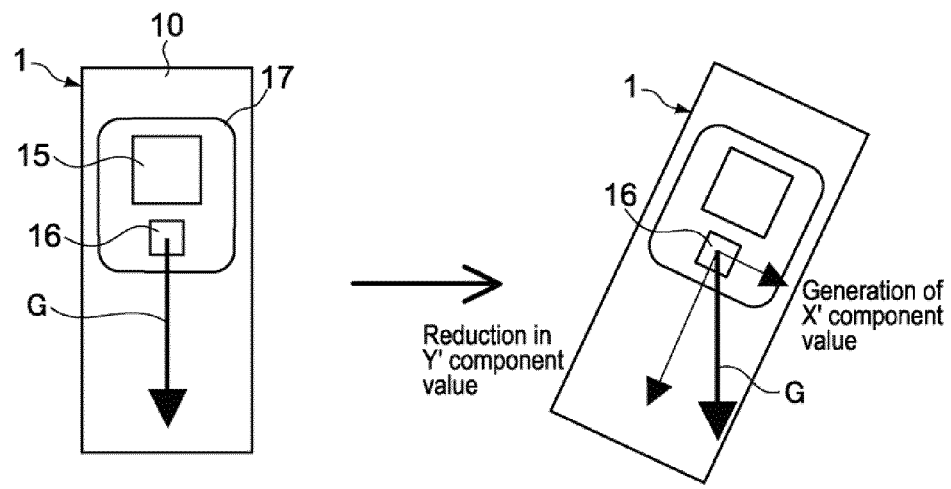
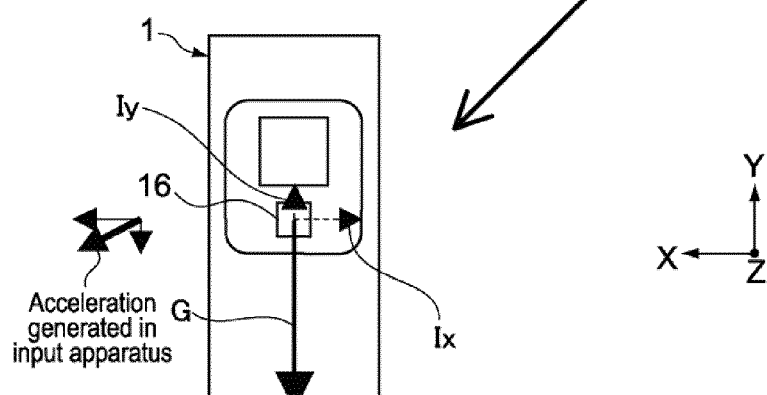
FIG.9A
FIG.9B
FIG.9C

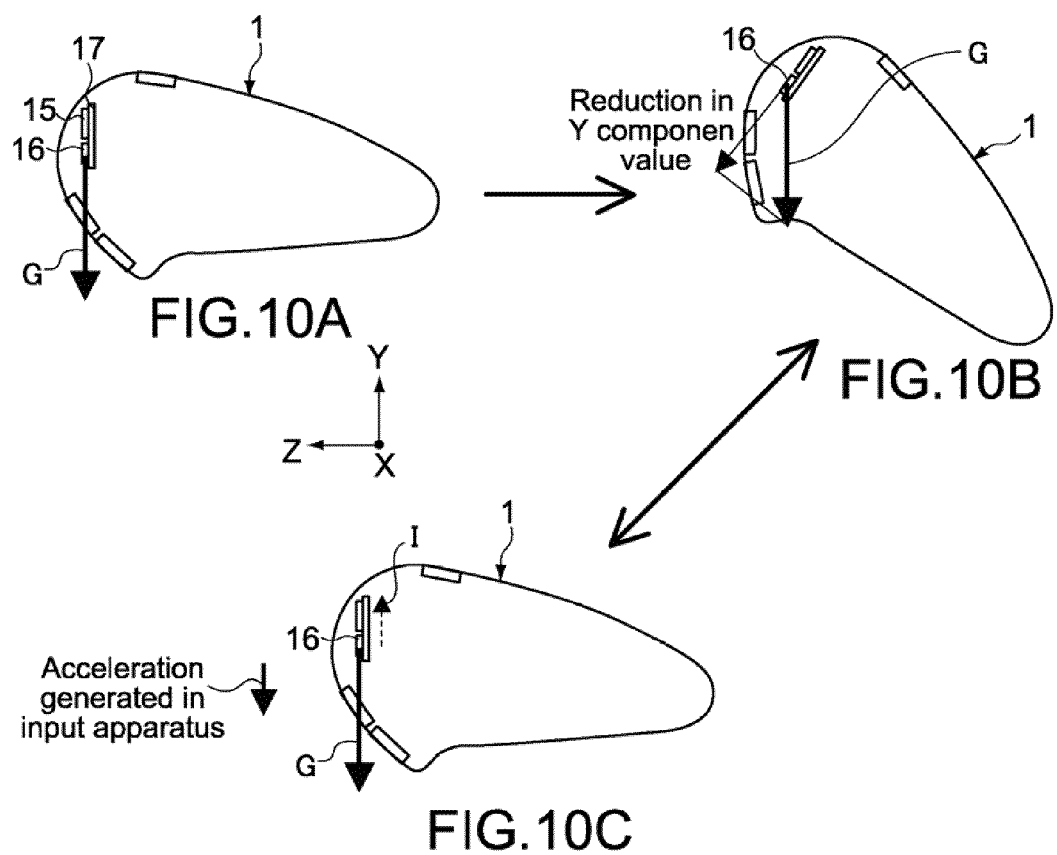

INFORMATION PROCESSING APPARATUS, INPUT APPARATUS, INFORMATION PROCESSING SYSTEM, INFORMATION PROCESSING METHOD, AND PROGRAM

CROSS REFERENCE TO RELATED APPLICATIONS

The present application is a National Stage of International Application No. PCT/JP2008/060489 filed on Jun. 6, 2008 and which claims priority to Japanese Patent Application No. 2007-152592 filed on Jun. 8, 2007, the entire contents of which are being incorporated herein by reference.

BACKGROUND

The present disclosure relates to an information processing apparatus, an input apparatus, an information processing system, an information processing method, and a program for processing input information in a GUI (Graphical User Interface) environment.

In recent years, it is becoming increasingly popular to connect a PC (Personal Computer) to a display of a television or the like and use it while relaxing in a living room. However, a desk or a table is not always in a room to relax in, such as the living room. Therefore, for usability of the PC, an application that eliminates a keyboard operation as much as possible has been developed, and, for a mouse, a pointing device (3-dimensional pointing device) that enables a pointer to move by being freely swung 3-dimensionally is starting to appear.

Incidentally, in a case of use in the living room, which is a recently-popular style, an operation is made at a position distant from a screen display, so operability may deteriorate. In the case of the 3-dimensional pointing device in particular, there is a fear that operability may deteriorate due to a human factor such as a hand movement, as compared to a pointing device such as a mouse of the related art, which is operated on a desk.

In this regard, as means for improving the operability, there has been devised a method of improving operability by making a pointer velocity variable when the pointer is moved to a specific object (or an area indicating a specific object) to be selected, such as an icon displayed on a screen (see, for example, Patent Document 1).

Patent Document 1. Japanese Utility Model Application Laid-open No. Hei 7-36243 (paragraph [0008], FIG. 2)

However, because, when other target objects are positioned on a path of a pointer moving to a specific target object that is supposed to be selected, a pointer velocity is lowered each time the pointer passes the target objects, there is a fear that operability may be rather deteriorated since reaching the target object that is supposed to be selected is time-consuming. In addition, because avoiding this involves being conscious of the movement path each time the pointer is moved, the operability deteriorates for sure.

SUMMARY

In view of the circumstances as described above, an information processing apparatus, an input apparatus, an information processing system, an information processing method, and a program that are capable of improving operability when selecting a target object on a screen are provided.

In an embodiment, there is provided an information processing apparatus including: a display means capable of displaying on a screen a plurality of target objects and a pointer for selecting a target object from the plurality of target objects; an input means for inputting first movement information for moving the pointer on the screen, movement restriction information for moving, when the pointer is indicating a predetermined area around the target object on the screen, the pointer such that the pointer indicates the target object, and restricting the movement of the pointer at that position, and execution information for executing, by the pointer, the target object indicated by the pointer on the screen; and a control means for performing movement control of the pointer and execution control of the target object based on the first movement information, the movement restriction information, and the execution information input by the input means.

In the embodiment, because the movement restriction information for moving, when the pointer is indicating the predetermined area around the target object on the screen, the pointer such that the pointer indicates the target object, and restricting the movement of the pointer at that position is input, and the movement control of the pointer is performed based on the movement restriction information, even when the pointer is not directly indicating the target object, roughly indicating the target object can lead to indication of the target object, thus improving the operability in selecting the target object on the screen by the pointer.

In the embodiment, the input means inputs second movement information for moving, when the movement of the pointer is restricted while indicating the target object on the screen, the pointer from the target object indicated by the pointer to another target object in a predetermined order; and the control means performs the movement control of the pointer based on the second movement information.

In the embodiment, when the pointer is indicating the predetermined area around the target object on the screen, the pointer is moved such that the pointer indicates the target object, there is a possibility that another target object in the vicinity of the target object may erroneously be indicated. In this regard, by structuring such that, when one target object is indicated, the pointer is moved to another target object in the predetermined order, the target object to be indicated can easily be changed to a desired target object.

In the embodiment, the input means inputs third movement information for moving, when the movement of the pointer is restricted while indicating the target object on the screen, the pointer to another target object around the target object indicated by the pointer; and the control means performs the movement control of the pointer based on the third movement information.

In the present embodiment, when the pointer is indicating the predetermined area around the target object on the screen, the pointer is moved such that the pointer indicates the target object as described above, there is a possibility that another target object in the vicinity of the target object may erroneously be indicated. Therefore, by structuring such that, when one target object is indicated, the pointer is moved to another target object around the indicated target object, the target object to be indicated can easily be changed to a desired target object.

In the embodiment, the input means inputs restriction cancel information for canceling the restriction on the movement of the pointer whose movement is restricted; and the control means performs the movement control of the pointer based on the restriction cancel information.

In the embodiment, when the pointer is indicating the predetermined area around the target object on the screen, the pointer is moved such that the pointer indicates the target object, there is a possibility that another target object in the vicinity of the target object may erroneously be indicated. In this regard, by structuring such that, when the movement of the pointer is restricted while indicating the target object, the restriction can be canceled, operability can be additionally improved.

According to the embodiment, the movement restriction information may contain information for moving the pointer such that the pointer indicates the another target object, and restricting the movement of the pointer at that position.

According to the embodiment, the input means may include a button for a user to make a switch as to whether or not to let the input apparatus recognize a movement of the input apparatus, and the control means may perform the movement control of the pointer based on, as the restriction cancel information, an operation signal of the button caused by the user.

According to the embodiment, the control means may perform the movement control of the pointer based on the first movement information as the restriction cancel information. In this case, the first movement information is a value on the movement of the input apparatus such as a velocity, acceleration, and angular velocity, or a value on other movements caused when the input apparatus is moved by certain gestures.

According to another embodiment, there is provided an information processing apparatus including: a display means capable of displaying on a screen a plurality of target objects and a pointer for selecting a target object from the plurality of target objects; an input means for inputting first movement information for moving the pointer on the screen, movement restriction information for moving, when the pointer is indicating a predetermined area around the target object on the screen, the pointer such that the pointer indicates the target object and restricting the movement of the pointer at that position, and restricting, when the pointer is indicating the target object, the movement of the pointer from the target object to outside the target object, and execution information for executing, by the pointer, the target object indicated by the pointer on the screen; and a control means for performing movement control of the pointer and execution control of the target object based on the first movement information, the movement restriction information, and the execution information input by the input means.

By the movement restriction information as described above, even when the pointer is positioned inside the area occupied by an image of the target object in the first place, the control means can restrict the movement of the pointer to the outside of the target object.

According to the embodiment, there is provided an input apparatus operating a pointer for selecting a target object from the plurality of target objects displayed on a screen, including: a first operation section to input first movement information for moving the pointer on the screen; a second operation section to input movement restriction information for moving, when the pointer is indicating a predetermined area around the target object on the screen, the pointer such that the pointer indicates the target object, and restricting the movement of the pointer at that position; and a third operation section to input execution information for executing the target object indicated by the pointer on the screen.

In the embodiment, due to the input of the movement restriction information for moving, when the pointer is indicating the predetermined area around the target object on the screen, the pointer such that the pointer indicates the target object, and restricting the movement of the pointer at that position, even when the pointer is not directly indicating the target object, roughly indicating the target object can lead to indication of the target object, thus improving the operability in selecting the target object on the screen by the pointer.

In the embodiment, the first operation section recognizes a movement of the input apparatus, and the recognized movement is input as the first movement information.

In the embodiment, a fourth operation section is provided to input second movement information for moving, when the movement of the pointer is restricted while indicating the target object on the screen, the pointer from the target object indicated by the pointer to another target object in a predetermined order.

In the embodiment, because, when the pointer is indicating the predetermined area around the target object on the screen, the pointer is moved such that the pointer indicates the target object, there is a possibility that another target object in the vicinity of the target object may erroneously be indicated. In this regard, by structuring such that, when one target object is indicated, the pointer is moved to another target object in the predetermined order, the target object to be indicated can easily be changed to a desired target object.

In the embodiment, the second operation section and the fourth operation section are constituted of a single scroll dial button; the second operation section performs the input when the scroll dial button is pressed; and the fourth operation section performs the input when a scroll dial of the scroll dial button is rotated.

In the embodiment, because, when the pointer is indicating the predetermined area around the target object on the screen, the pointer is moved such that the pointer indicates the target object, there is a possibility that another target object in the vicinity of the target object may erroneously be indicated. In this regard, by structuring such that, when one target object is indicated, the second operation section performs the input when the scroll dial button is pressed and the fourth operation section performs the input when the scroll dial of the scroll dial button is rotated, the target object to be indicated can easily be changed to a desired target object.

In the embodiment, by further including a fifth operation section to input third movement information for moving, when the movement of the pointer is restricted while indicating the target object on the screen, the pointer to another target object around the target object indicated by the pointer.

In the embodiment, because, when the pointer is indicating the predetermined area around the target object on the screen, the pointer is moved such that the pointer indicates the target object as described above, there is a possibility that another target object in the vicinity of the target object may erroneously be indicated. Therefore, by structuring such that, when one target object is indicated, the pointer is moved to another target object around the indicated target object, the target object to be indicated can easily be changed to a desired target object.

According to another embodiment, there is provided an input apparatus operating a pointer for selecting a target object from the plurality of target objects displayed on a screen, including: a first operation section to input first movement information for moving the pointer on the screen; a second operation section to input movement restriction information for moving, when the pointer is indicating a predetermined area around the target object on the screen, the pointer such that the pointer indicates the target object and restricting the movement of the pointer at that position, and restricting, when the pointer is indicating the target object, the movement of the pointer from the target object to outside the target object; and a third operation section to input execution information for executing the target object indicated by the pointer on the screen.

According to the present embodiment, there is provided an information processing system including: a display apparatus to display on a screen a plurality of target objects and a pointer for selecting a target object from the plurality of target objects; an input apparatus including a first operation section to input first movement information for moving the pointer on the screen, a second operation section to input movement restriction information for moving, when the pointer is indicating a predetermined area around the target object on the screen, the pointer such that the pointer indicates the target object, and restricting the movement of the pointer at that position, and a third operation section to input execution information for executing the target object indicated by the pointer on the screen, and an information processing apparatus including an input means for inputting the first movement information, the movement restriction information, and the execution information, and a control means for performing movement control of the pointer and execution control of the target object based on the first movement information, the movement restriction information, and the execution information input by the input means.

In the present embodiment, because the movement restriction information for moving, when the pointer is indicating the predetermined area around the target object on the screen of the display apparatus, the pointer such that the pointer indicates the target object, and restricting the movement of the pointer at that position is input to the information processing apparatus from the input apparatus, and the information processing apparatus performs the movement control of the pointer based on the movement restriction information, even when the pointer is not directly indicating the target object, roughly indicating the target object can lead to indication of the target object, thus improving the operability in selecting the target object on the screen by the pointer.

In the embodiment, the input apparatus is a 3-dimensional pointing device. Accordingly, when the pointer is moved on the screen by the input apparatus, roughly indicating the target object can lead to indication of the target object, thus improving the operability in selecting the target object on the screen by the pointer.

According to the present embodiment, there is provided an information processing method including: displaying on a screen a plurality of target objects and a pointer for selecting a target object from the plurality of target objects; moving the pointer on the screen; moving, when the pointer is indicating a predetermined area around the target object on the screen, the pointer such that the pointer indicates the target object, and restricting the movement of the pointer at that position; and executing the target object indicated by the pointer on the screen.

In the present embodiment, because, when the pointer is indicating the predetermined area around the target object on the screen, the pointer is moved such that the pointer indicates the target object, and the movement of the pointer is restricted at that position, even when the pointer is not directly indicating the target object, roughly indicating the target object can lead to indication of the target object, thus improving the operability in executing the target object on the screen by the pointer.

According to another embodiment, there is provided an information processing method including: displaying on a screen a plurality of target objects and a pointer for selecting a target object from the plurality of target objects; moving the pointer on the screen; moving, when the pointer is indicating a predetermined area around the target object on the screen, the pointer such that the pointer indicates the target object, and restricting the movement of the pointer at that position; restricting, when the pointer is indicating the target object, the movement of the pointer from the target object to outside the target object; and executing the target object indicated by the pointer on the screen.

According to the present embodiment, there is provided a program causing an information processing apparatus to execute: displaying on a screen a plurality of target objects and a pointer for selecting a target object from the plurality of target objects; moving the pointer on the screen; moving, when the pointer is indicating a predetermined area around the target object on the screen, the pointer such that the pointer indicates the target object, and restricting the movement of the pointer at that position; and executing the target object indicated by the pointer on the screen.

In the present embodiment, because, when the pointer is indicating the predetermined area around the target object on the screen, the pointer is moved such that the pointer indicates the target object, and the movement of the pointer is restricted at that position, even when the pointer is not directly indicating the target object, roughly indicating the target object can lead to indication of the target object, thus improving the operability in executing the target object on the screen by the pointer.

According to another embodiment, there is provided an information processing apparatus including: an input means for inputting movement information for moving on a screen a plurality of target objects and a pointer for selecting a target object from the plurality of target objects; a movement control means for controlling the movement of the pointer on the screen based on the movement information input by the input means; and a display control means for controlling display of the screen such that, when the pointer is indicating a predetermined area around the target object on the screen, at least one of the pointer and the target object is displayed with emphasis.

According to another embodiment, there is provided an information processing apparatus including: an input means for inputting movement information for moving on a screen a plurality of target objects and a pointer for selecting a target object from the plurality of target objects; a movement control means for controlling the movement of the pointer on the screen based on the movement information input by the input means; and a display control means for controlling display of the screen such that, when the pointer is indicating a predetermined area around the target object on the screen, the target object is moved to a position of the pointer.

As described above, according to the present invention, the operability in selecting the target object on the screen can be improved.

Additional features and advantages are described herein, and will be apparent from, the following Detailed Description and the figures.

BRIEF DESCRIPTION OF THE FIGURES

FIG. 1 A diagram showing a control system according to an embodiment.

FIG. 9 Diagrams for illustrating a gravitational effect with respect to an acceleration sensor unit.

FIG. 10 Diagrams for illustrating the gravitational effect with respect to the acceleration sensor unit.

DETAILED DESCRIPTION

Figure 2:
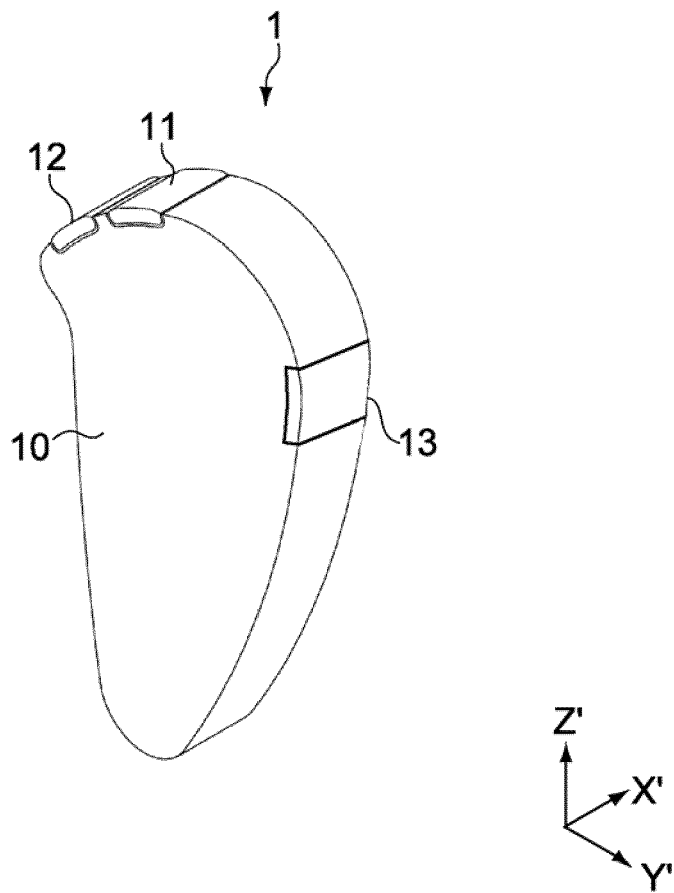
FIG. 2 A perspective diagram showing an input apparatus.

Hereinafter, embodiments will be described with reference to the drawings.

FIG. 1 is a diagram showing a control system according to an embodiment. A control system 100 includes a display apparatus 5, a control apparatus 40 as an information processing apparatus, and an input apparatus 1.

As shown in FIG. 1, the control apparatus 40 is a computer and includes an MPU 35 (or CPU), a RAM 36, a ROM 37, a receiver device 38, an antenna 39, and a video RAM 41.

The receiver device 38 receives a control signal transmitted from the input apparatus 1 via the antenna 39. Information received by the receiver device 38 includes first movement information, movement restriction information, and execution information to be described later.

Based on the control signal, the MPU 35 carries out calculations for controlling a movement of a pointer (cursor) 2 displayed on a screen 3 of the display apparatus 5 or calculations for controlling execution of an icon 4. As a result, a display control signal for controlling a UI displayed on the screen 3 of the display apparatus 5 is generated.

The video RAM 41 stores screen data generated in response to the display control signal and displayed on the display apparatus 5.

The control apparatus 40 may be an apparatus dedicated to the input apparatus 1, or may be a PC or the like. The control apparatus 40 is not limited to the PC, and may be a computer integrally formed with the display apparatus 5, audiovisual equipment, a projector, a game device, a car navigation system, or the like.

FIG. 2 is a perspective diagram showing the input apparatus 1.

The input apparatus 1 is a 3-dimensional pointing device used for inputting information to the display apparatus 5. The input apparatus 1 is of a size that a user is capable of holding. As shown in FIG. 2, the input apparatus 1 includes a casing 10 and operation sections such as three buttons 11, 12, and 13 provided at an upper portion of the casing 10.

The button 11 is disposed closer to the center of the upper portion of the casing 10 and has a function of a left button of a mouse as an input device used for a PC, for example. A file is executed by double-clicking the button 11.

The button 12 is adjacent to the button 11 and has a function of a right button of a mouse. For example, a "drag and drop" operation can be made by moving the input apparatus 1 while press-and-holding the button 12.

As will be described later, the button 13 is a button for switching effectiveness/ineffectiveness of the function of recognizing a movement of the input apparatus 1. By pressing the button 13, effectiveness/ineffectiveness of the function of recognizing the movement of the input apparatus 1 is switched.

It should be noted that the function of recognizing the movement may be made effective when the button 13 is being pressed, and the function of recognizing the movement may be made ineffective when the button 13 is not being pressed. Conversely, the function of recognizing the movement may be made ineffective when the button 13 is being pressed, and the function of recognizing the movement may be made effective when the button 13 is not being pressed. Locations of the buttons 11, 12, and 13, a content of a command issued, and the like can arbitrarily be changed.

Figure 3:
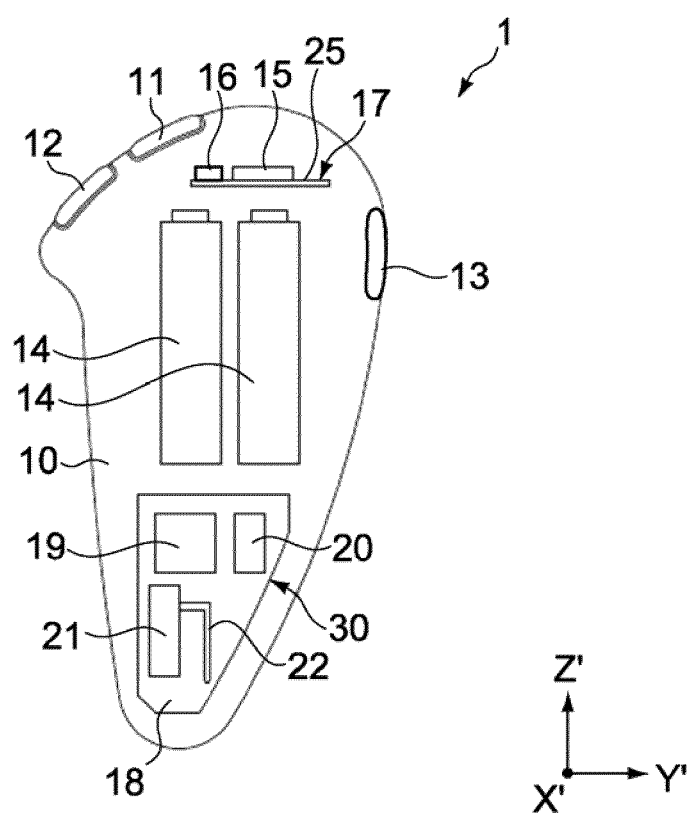
FIG. 3 A diagram schematically showing an internal structure of the input apparatus.

FIG. 3 is a diagram schematically showing an internal structure of the input apparatus 1. For the sake of convenience, in description of FIGS. 2 and 3, a longitudinal direction of the casing 10 will be referred to as Z' direction, a thickness direction of the casing 10 will be referred to as X' direction, and a width direction of the casing 10 will be referred to as Y' direction.

As shown in FIG. 3, the input apparatus 1 includes a control unit 30, a sensor unit 17, and batteries 14.

The control unit 30 includes a main substrate 18, an MPU 19 (Micro Processing Unit) (or CPU) mounted on the main substrate 18, a crystal oscillator 20, a transmitting device 21, and an antenna 22 printed on the main substrate 18.

Figure 4:
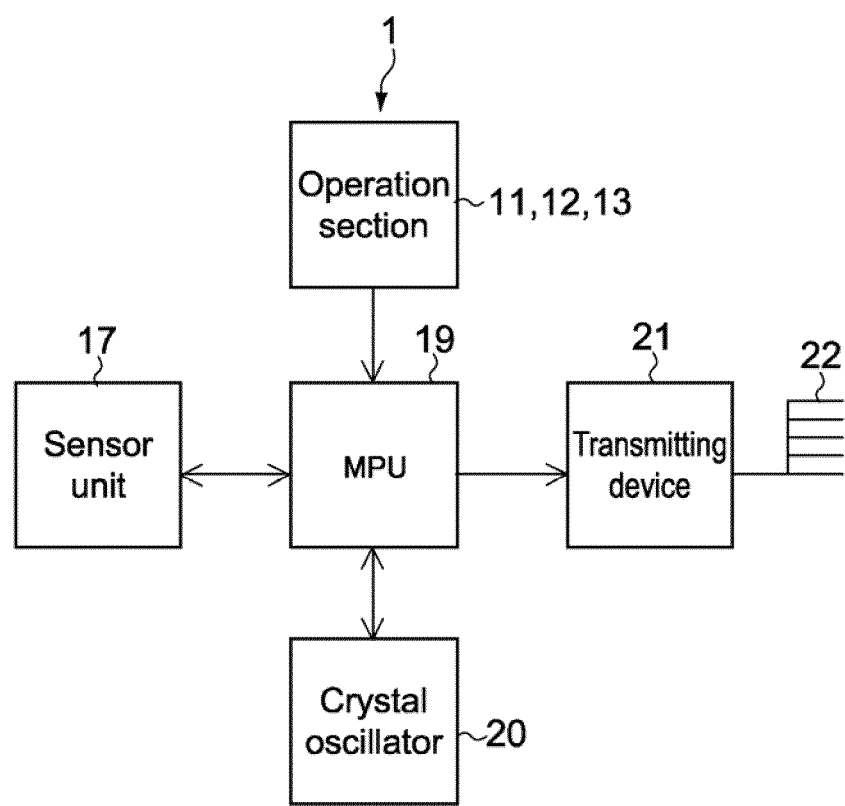
FIG. 4 A block diagram showing an electrical configuration of the input apparatus.

FIG. 4 is a block diagram showing an electrical structure of the input apparatus 1.

As shown in FIG. 4, the MPU 19 includes a built-in volatile or nonvolatile memory requisite therefor. The MPU 19 is input with a detection signal from the sensor unit 17, an operation signal from the operation section, and the like, and executes various calculations in order to generate control signals of the first movement information, the movement restriction information, and the execution information in response to those input signals.

The first movement information is information on an angular velocity, an acceleration, a velocity value, coordinates, or the like of the input apparatus 1 for moving the pointer 2 on the screen 3. The movement restriction information is information indicating whether the button 13 has been pressed or information on coordinates of an area 4A indicated by the pointer 2 out of a plurality of areas 4A. The execution information is information for executing the icon 4 indicated by the pointer 2 on the screen 3 by the pointer 2, like information indicating whether the button 12 has been double-clicked, for example.

The crystal oscillator 20 generates clocks and supplies them to the MPU 19. As the batteries 14, dry cell batteries, rechargeable batteries, and the like are used.

The transmitting device 21 transmits control signals (input information) generated in the MPU 19 as RF radio signals to the control apparatus 40 via the antenna 22.

Figure 5:
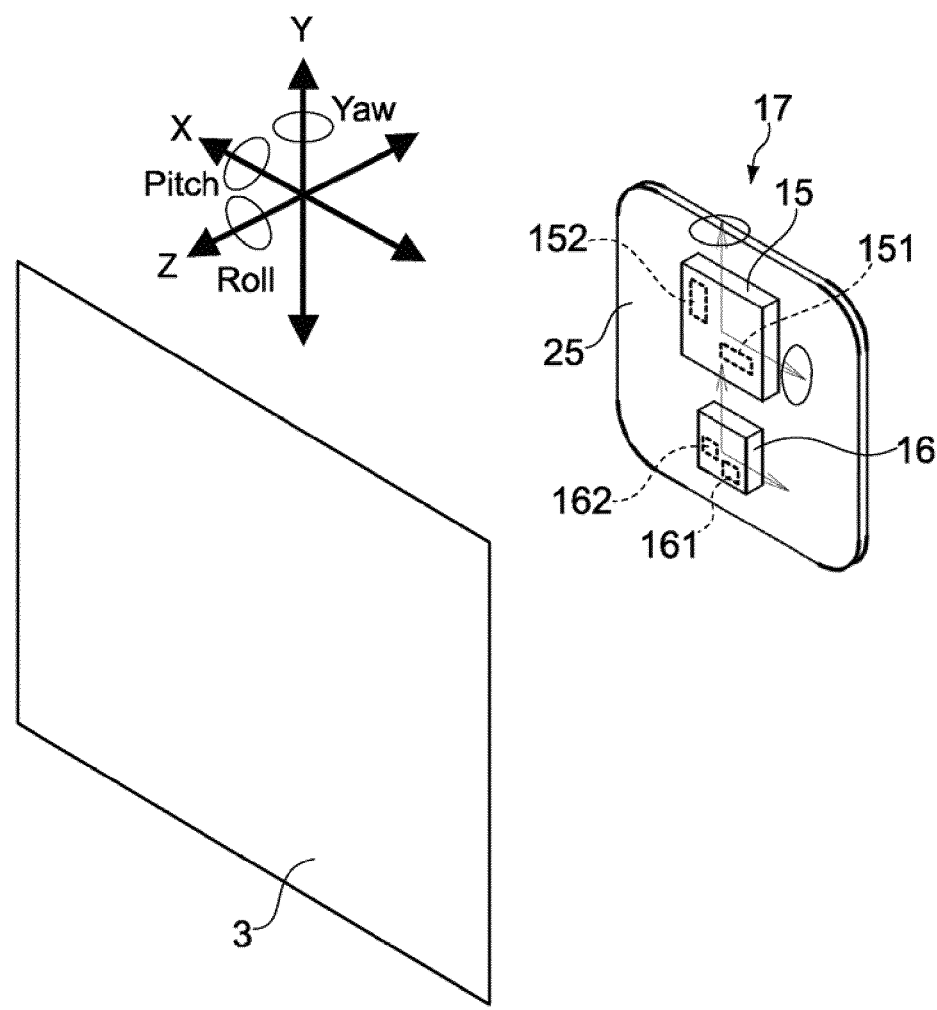
FIG. 5 A perspective diagram showing a sensor unit.

FIG. 5 is a perspective diagram showing the sensor unit 17. The sensor unit 17 includes an acceleration sensor unit 16 for detecting accelerations in different angles such as along two orthogonal axes (X axis and Y axis). Specifically, the acceleration sensor unit 16 includes two sensors, that is, a first acceleration sensor 161 and a second acceleration sensor 162. The sensor unit 17 further includes an angular velocity sensor unit 15 for detecting angular accelerations about the two orthogonal axes. Specifically, the angular velocity sensor unit 15 includes two sensors, that is, a first angular velocity sensor 151 and a second angular velocity sensor 152. The acceleration sensor unit 16 and the angular velocity sensor unit 15 are packaged and mounted on a circuit board 25.

As each of the first angular velocity sensor 151 and the second angular velocity sensor 152, a vibration gyro sensor for detecting Coriolis force in proportion to an angular velocity is used. As each of the first acceleration sensor 161 and the second acceleration sensor 162, any sensor such as a piezoresistive sensor, a piezoelectric sensor, or a capacitance sensor may be used.

The sensor unit 17 is incorporated into the casing 10 such that a surface of the circuit board 25 on which the acceleration sensor unit 16 and the angular velocity sensor unit 15 are mounted becomes substantially parallel to an X'-Y' plane. As described above, the sensor units 16 and 15 each detect physical amounts with respect to the two axes, that is, the X axis and the Y axis. Hereinafter, a coordinate system that moves along with the input apparatus 1, that is, a coordinate system fixed to the input device I will be represented by the X' axis, Y' axis, and Z' axis. On the other hand, a coordinate system stationary on earth, that is an inertial coordinate system will be represented by the X axis, Y axis, and Z axis. Further, in descriptions below, with regard to the movement of the input apparatus 1, a rotational direction about the X' axis is sometimes referred to as pitch direction, a rotational direction about the Y' axis is sometimes referred to as yaw direction, and a rotational direction about the Z' axis is sometimes referred to as roll direction.

Figure 6:
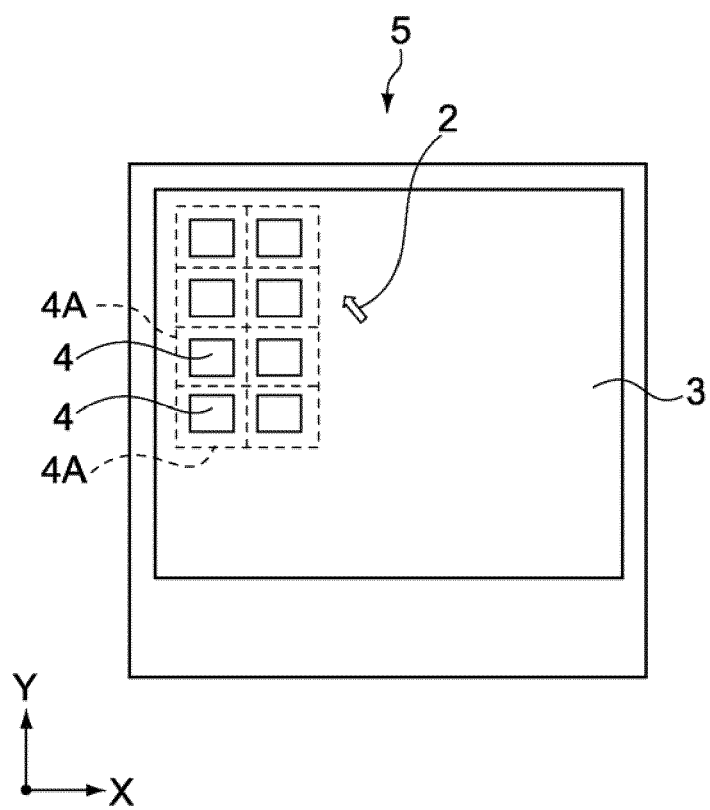
FIG. 6 A diagram showing an example of a screen displayed on a display apparatus.

FIG. 6 is a diagram showing an example of the screen 3 displayed on the display apparatus 5. Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like. Unless stated otherwise, to help understand descriptions below, the UI as an operation target of the input apparatus 1 will be described as being the pointer 2 (pointer).

On the screen 3, UIs such as the icons 4 and the pointer 2 are displayed. The icons are images representing, on the screen 3, functions of programs, execution commands, file contents, and the like of the computer. As shown in FIG. 6, around the icons 4, the areas 4A are respectively disposed so as to surround the icons 4. As will be described later, if the button 13 is pressed when the pointer 2 is indicating the area 4A, the pointer 2 is moved so as to indicate the icon 4 inside the area 4A, and the movement of the pointer 2 is restricted at that position. It should be noted that on the screen 3, a horizontal direction is referred to as X-axis direction and a vertical direction is referred to as Y-axis direction.

Figure 7:
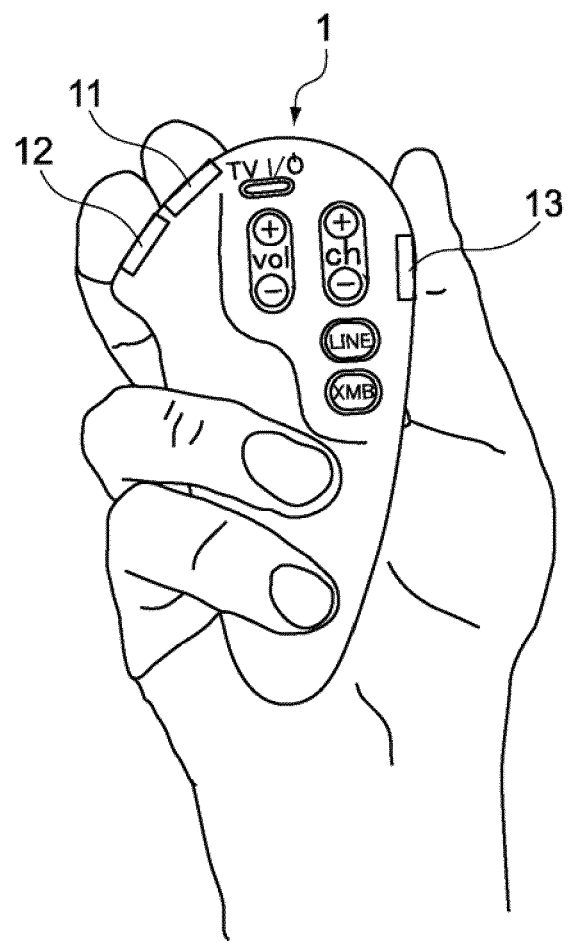
FIG. 7 A diagram showing a state where a user is holding the input apparatus.

FIG. 7 is a diagram showing a state where a user is holding the input apparatus 1. As shown in FIG. 7, the input apparatus 1 may include, in addition to the buttons 11, 12, and 13, operation sections including various operation buttons such as those provided to a remote controller for operating a television or the like and a power switch, for example. Input information generated when the user moves the input apparatus 1 in the air or operates the operation section while holding the input apparatus 1 as shown in the figure is output to the control apparatus 40, and the control apparatus 40 controls the UI.

Next, a description will be given on typical examples of ways of moving the input apparatus 1 and ways the pointer 2 moves on the screen 3 thereby. FIG. 8 are explanatory diagrams therefor.

Figure 8A:
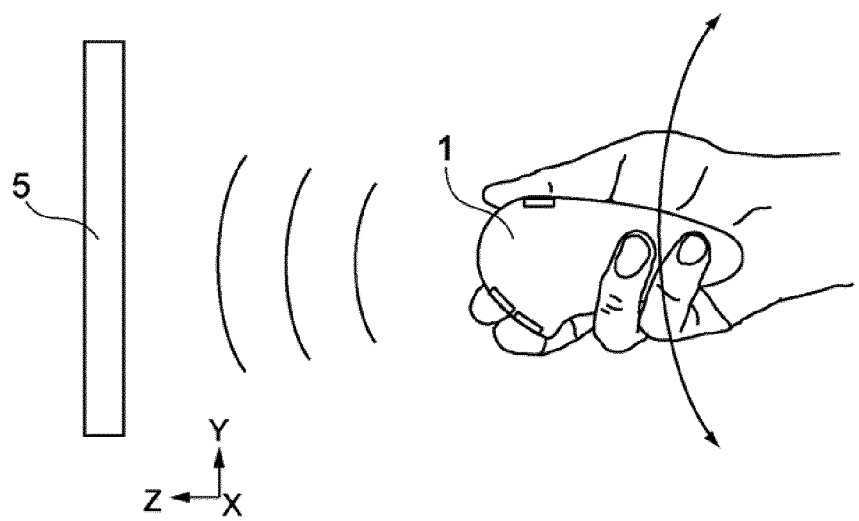
FIG. 8 Explanatory diagrams for illustrating typical examples of ways of moving the input apparatus and ways a pointer moves on the screen thereby.
Figure 8B:
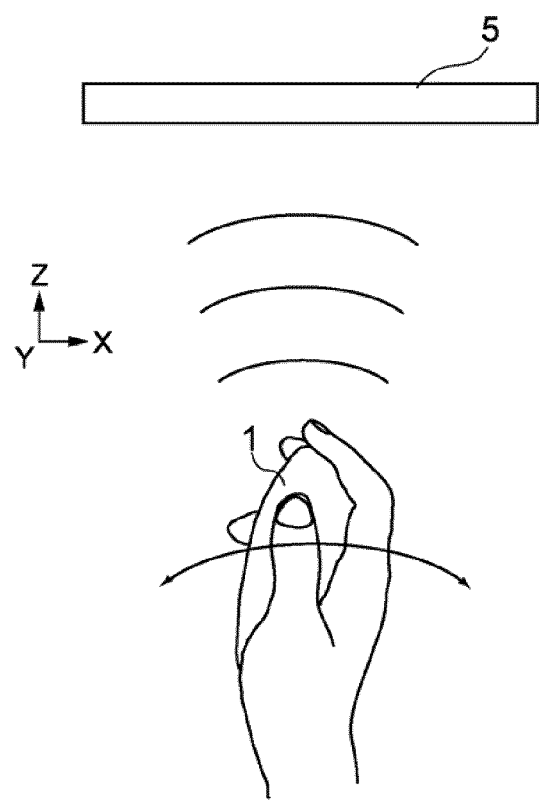

As shown in FIGS. 8A and 8B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 5) of the sensor unit 17 is close to being in parallel with the screen 3 of the display apparatus 5, and the two axes as detection axes of the sensor unit 17 respectively correspond to the horizontal axis (X axis) and the vertical axis (Y axis) on the screen 3. Hereinafter, the position of the input apparatus 1 as shown in FIGS. 8A and 8B is referred to as reference position.

As shown in FIG. 8A, in the reference position, the user moves a wrist or an arm in the vertical direction, that is, swings it in the pitch direction. At this time, the second acceleration sensor 162 detects an acceleration in the Y-axis direction (second acceleration) and the first angular velocity sensor 151 detects an angular velocity about the X axis (first angular velocity) (see FIG. 5). Based on the first movement information as those detection values, the control apparatus 40 controls display of the pointer 2 so as to move the pointer 2 in the Y-axis direction.

Meanwhile, as shown in FIG. 8B, in the reference position, the user moves the wrist or the arm in the lateral direction, that is, swings it in the yaw direction. At this time, the first acceleration sensor 161 detects an acceleration in the X-axis direction (first acceleration) and the second angular velocity sensor 152 detects an angular velocity about the Y axis (second angular velocity) (see FIG. 5). Based on the first movement information as those detection values, the control apparatus 40 controls display of the pointer 2 so as to move the pointer 2 in the X-axis direction.

Although descriptions will be given later, in the embodiment, the MPU 19 of the input apparatus 1 calculates the velocity values in the yaw and pitch directions based on the detection values detected by the sensor unit 17 in accordance with the program stored in the built-in nonvolatile memory. In this case, mainly the MPU 19 of the input apparatus 1 calculates the velocity information. Here, for control of the movement of the pointer 2, a dimension of an integration value (velocity) of biaxial acceleration values detected by the acceleration sensor unit 16 is used in principle. Input information of the velocity dimension is transmitted to the control apparatus 40.

In another embodiment, the input apparatus 1 transmits, as the input information, physical amounts detected by the sensor unit 17 to the control apparatus 40. In this case, the MPU 35 of the control apparatus 40 calculates, in accordance with the program stored in the ROM 37, the velocity values in the yaw and pitch directions based on the received input information, and performs display so as to move the pointer 2 in accordance with the velocity values (see FIG. 14).

The control apparatus 40 converts a displacement in the yaw direction per unit time into a displacement amount of the pointer 2 on the X axis on the screen 3, and converts a displacement in the pitch direction per unit time into a displacement amount of the pointer 2 on the Y axis on the screen 3, to thus move the pointer 2. Typically, regarding the velocity values supplied every predetermined number of clocks, the MPU 35 of the control apparatus 40 adds an n-th velocity value that has been supplied to a (n−1)-th velocity value that has been supplied. Accordingly, the n-th velocity value that has been supplied corresponds to the displacement amount of the pointer 2, and coordinate information of the pointer 2 on the screen 3 is generated. In this case, mainly the MPU 35 of the control apparatus 40 calculates the coordinate information.

A calculation method regarding an integral of the acceleration values that is used when calculating the velocity values only needs to be the same as that for the displacement amount.

Next, a description will be given on a gravitational effect with respect to the acceleration sensor unit 16. FIGS. 9 and 10 are explanatory diagrams therefor. FIG. 9 are diagrams showing the input apparatus 1 seen from the Z direction. FIG. 10 are diagrams showing the input apparatus 1 seen from the X direction.

In FIG. 9A, the input apparatus 1 is in the reference position and is held still. At this time, an output of the first acceleration sensor 161 is substantially 0, and an output of the second acceleration sensor 162 is an output corresponding to a gravity acceleration G. However, as shown in FIG. 9B, for example, in a state where the input apparatus 1 is tilted in the roll direction, the first and second acceleration sensors 161 and 162 respectively detect acceleration values of tilt components of the gravity acceleration G.

In this case, the first acceleration sensor 161 detects the acceleration in the X-axis direction even when the input apparatus 1 is not actually moved in the X-axis direction in particular. The state shown in FIG. 9B is equivalent to a state where, when the input apparatus 1 is in the reference position as shown in FIG. 9C, the acceleration sensor unit 16 has received inertial forces Ix and Iy as respectively indicated by arrows with broken lines, thus being undistinguishable by the acceleration sensor unit 16. As a result, the acceleration sensor unit 16 judges that an acceleration in a downward left-hand direction as indicated by an arrow is applied to the input apparatus 1 and outputs a detection signal different from the actual movement of the input apparatus 1. In addition, because the gravity acceleration G constantly acts on the acceleration sensor unit 16, an integration value is increased and an amount by which the pointer 2 is displaced in the downward oblique direction is increased at an accelerating pace. When the state is shifted from that shown in FIG. 9A to that shown in FIG. 9B, it is considered that inhibition of the movement of the pointer 2 on the screen 3 is an operation that intrinsically matches the intuitional operation of the user.

The same holds true also when the input apparatus 1 is rotated in the pitch direction from the reference position of the input apparatus 1 as shown in FIG. 10A to tilt as shown in FIG. 10B, for example. In such a case, because the gravity acceleration G detected by the second acceleration sensor 162 at the time the input apparatus 1 is in the reference position decreases, it is difficult for the input apparatus 1 to make a distinguishment from the inertial force 1 in the pitch direction as shown in FIG. 10C.

Figure 11:
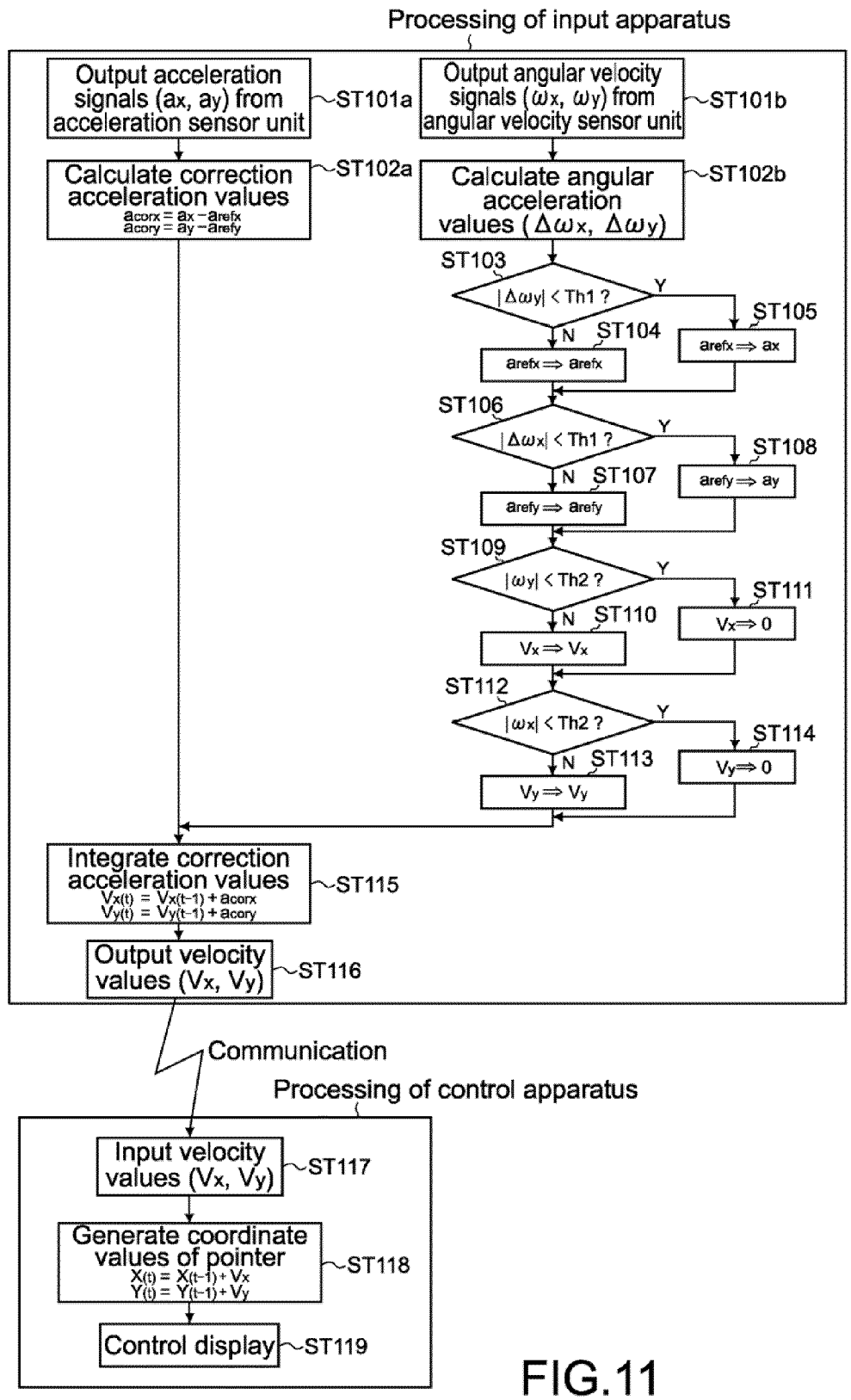
FIG. 11 A flowchart showing an operation performed when calculating velocity values of the input apparatus using angular velocity values detected by an angular velocity sensor unit.

To reduce such a gravitational effect with respect to the acceleration sensor unit 16 as much as possible, the input apparatus 1 of this embodiment uses the angular velocity values detected by the angular velocity sensor unit 15 to calculate the velocity values of the input apparatus 1. Hereinafter, descriptions will be given on an operation thereof. FIG. 11 is a flowchart showing the operation.

Power of the input apparatus 1 is turned on. For example, the user turns on a power switch or the like provided to the input apparatus 1 or the control apparatus 40 to turn on the power of the input apparatus 1. Upon turning on the power, biaxial acceleration signals (first and second acceleration values $a_x$ and $a_y$) are output from the acceleration sensor unit 16 (Step 101a) to be supplied to the MPU 19. The acceleration signals are signals corresponding to the position of the input apparatus 1 at a point when the power is turned on (hereinafter, referred to as initial position).

There are cases where the initial position is the reference position. However, a position at which the entire amount of the gravity acceleration is detected in the X-axis direction, that is, a position at which the output of the first acceleration sensor 161 is the acceleration value corresponding to the gravity acceleration and the output of the second acceleration sensor 162 is 0 is also possible. As a matter of course, as the initial position, a position tilted as shown in FIG. 9B is also possible.

The MPU 19 of the input apparatus 1 obtains the acceleration signals ($a_x$, $a_y$) from the acceleration sensor unit 16 every predetermined number of clocks. Upon obtaining the second and subsequent acceleration signals ($a_x$, $a_y$), the MPU 19 performs the following calculation to remove the gravitational effect. Specifically, as in Equations (1) and (2) below, the MPU 19 subtracts gravity acceleration components (first $a_x$ ($=a_{refx}$) and $a_y$ ($=a_{refy}$)) detected last time in the X- and Y-axis directions from the currently-obtained acceleration values $a_x$ and $a_y$, respectively, to thereby generate a first correction acceleration value $a_{corx}$ and a second correction acceleration value $a_{cory}$ (Step 102a).

$$a_{corx}=a_x-a_{refx} \quad (1)$$

$$a_{cory}=a_y-a_{refy} \quad (2)$$

Hereinafter, $a_{refx}$ and $a_{refy}$ will be referred to as reference acceleration value on the X axis and reference acceleration value on the Y axis (first reference acceleration value and second reference acceleration value), respectively, $a_{refx}$ and $a_{refy}$ used in the first calculation of Step 102a since turning on the power are acceleration signals $a_x$ and $a_y$ detected right after the power is turned on.

As shown in Equations (3) and (4), the MPU 19 calculates a first velocity value $V_x$ and a second velocity value $V_y$ by respectively adding the first and second correction acceleration values $a_{corx}$ and $a_{cory}$, that is, by an integration operation (Step 115).

$$V_x(t)=V_x(t-1)+a_{corx} \quad (3)$$

$$V_y(t)=V_y(t-1)+a_{cory} \quad (4)$$

$V_x(t)$ and $V_y(t)$ represent the currently-obtained velocity values and $V_x(t-1)$ and $V_y(t-1)$ represent previous velocity values.

Meanwhile, as described above, upon turning on the power of the input apparatus 1, biaxial angular velocity signals (first and second angular velocity values $\omega_x$, $\omega_y$) are output from the angular velocity sensor unit 15 (Step 101b) to be supplied to the MPU 19. Upon obtainment, the MPU 19 calculates the angular acceleration values (first angular acceleration value $\Delta\omega_x$ and second angular acceleration value $\Delta\omega_y$) by a derivation operation (Step 102b).

The MPU 19 judges whether absolute values $|\Delta\omega_x|$ and $|\Delta\omega_y|$ of $\Delta\omega_x$ and $\Delta\omega_y$ above are smaller than a threshold value Th1 (Steps 103 and 106). When $|\Delta\omega_y| \geq Th1$, the MPU 19 uses the first reference acceleration value $a_{refx}$ as it is and does not update it (Step 104). Similarly, when $|\Delta\omega_x| \geq Th1$, the MPU 19 uses the second reference acceleration value $a_{refy}$ as it is and does not update it (Step 107).

A value close to 0 is set as the threshold value Th1. The threshold value Th1 takes into account the angular velocity values that are detected due to a hand movement of the user, a DC offset, or the like even when the user is consciously holding the input apparatus 1 still. Thus, the pointer 2 is prevented from being moved during display due to a hand movement or a DC offset in the case where the user is consciously holding the input apparatus 1 still.

Reasons for performing the processing as described above are as follows.

Figure 12:
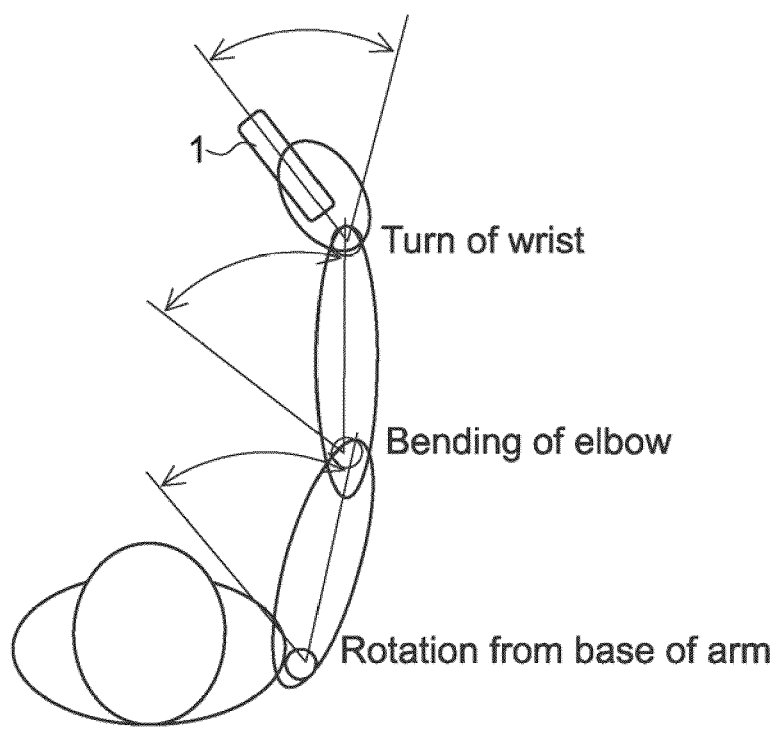
FIG. 12 A top view of a user operating the input apparatus.

FIG. 12 is a top view of the user operating the input apparatus 1. When the user operates the input apparatus 1 naturally, the operation is made by at least one of a rotation from a base of an arm, bending of an elbow, and a turn of a wrist. Therefore, generation of the acceleration leads to generation of the angular acceleration. Specifically, the acceleration is assumed to be subservient to the angular acceleration in the same direction as the acceleration. Therefore, by the MPU 19 monitoring the second angular acceleration value $|\Delta\omega_y|$, it is possible to judge whether to update the first reference acceleration value $a_{refx}$ in the same direction, and judge whether to eventually correct the first correction acceleration value $a_{corx}$ from Equation (1). The same holds true for the first angular acceleration value $|\Delta\omega_x|$.

More specifically, when the second angular acceleration value $|\Delta\omega y|$ is equal to or larger than the threshold value Th1, the MPU 19 judges that the input apparatus 1 is moving in the yaw direction. In this case, the MPU 19 does not update the first reference acceleration value $a_{refx}$ and consequently does not correct the first correction acceleration value $a_{corx}$ and continues on with the integration operation of Equation (3) based on $a_{corx}$.

Further, when the first angular acceleration value $|\Delta\omega_x|$ is equal to or larger than the threshold value Th1, the MPU 19 judges that the input apparatus 1 is moving in the pitch direction. In this case, the MPU 19 does not update the second reference acceleration value $a_{refy}$ and consequently does not correct the second correction acceleration value $a_{cory}$ and continues on with the integration operation of Equation (4) based on $a_{cory}$.

Meanwhile, when the second angular acceleration value $|\Delta\omega_y|$ is smaller than the threshold value Th1 in Step 103, the MPU 19 judges that the input apparatus 1 is not moved in the yaw direction. In this case, the MPU 19 updates the first reference acceleration value $a_{refx}$ to the currently-obtained (latest) detection value $a_x$, to thereby correct the first correction acceleration value $a_{corx}$ using Equation (1) (Step 105). The latest detection value $a_x$ is, in other words, a detection value obtained while the input apparatus 1 is held almost still, thus being a component value by the gravity acceleration.

Similarly, when the first angular acceleration value $|\Delta\omega_x|$ is smaller than the threshold value Th1 in Step 106, the MPU 19 judges that the input apparatus 1 is not moved in the pitch direction. In this case, the MPU 19 updates the second reference acceleration value $a_{refy}$ to the currently-obtained (latest) detection value $a_y$, to thereby correct the second correction acceleration value $a_{cory}$ using Equation (2) (Step 108).

It should be noted that in this embodiment, the threshold values in both the yaw direction and the pitch direction have been set to the same value Th1. However, different threshold values may be used for those directions.

In the descriptions above, the angular acceleration values $\Delta\omega_x$ and $\Delta\omega_y$ have been monitored, but the MPU 19 can also monitor the angular velocity values $\omega_x$ and $\omega_y$ to correct the velocity values calculated in Equations (3) and (4). Based on the same idea as that of FIG. 12, assuming that generation of the velocity leads to generation of the angular velocity, it can be assumed that the velocity is subservient to the angular velocity in the same direction as the velocity.

Specifically, when the absolute value of the second angular velocity value $|\omega_y|$ is equal to or larger than a threshold value Th2 (NO in Step 109), the MPU 19 judges that the input apparatus 1 is moving in the yaw direction. In this case, the MPU 19 does not correct the first velocity value $V_x$ (Step 110). The same holds true for the absolute value of the first angular velocity value $|\omega_x|$ (NO in Step 112, and Step 113).

The threshold value Th2 also only needs to be set in the same manner as the threshold value Th1.

On the other hand, when the absolute value of the second angular velocity value $|\omega_y|$ is smaller than the threshold value Th2 (YES in Step 109), the MPU 19 judges that the input apparatus 1 is not moved in the yaw direction. In this case, the MPU 19 corrects the first velocity value $V_x$ so as to reset it to 0, for example (Step 111). The same holds true for the absolute value of the first angular velocity value $|\omega_x|$ (YES in Step 112, and Step 114).

The MPU 19 outputs the velocity values $V_x$ and $V_y$ in both directions as described above, and the transmitting device 21 outputs to the control apparatus 40 the input information on the velocity values (Step 116).

The MPU 35 of the control apparatus 40 is input with the velocity values $V_x$ and $V_y$ as the input information (first movement information) (Step 117). The MPU 35 generates coordinate values X and Y of the pointer 2 shown in Equations (5) and (6) below, that correspond to the velocity values $V_x$ and $V_y$ (Step 118), and controls display so as to move the pointer 2 on the screen 3 (Step 119).

$$X(t)=X(t-1)+V_x \quad (5)$$

$$Y(t)=Y(t-1)+V_y \quad (6)$$

As described above, the reference acceleration values $a_{refx}$ and $a_{refy}$ are updated and the correction acceleration values $a_{corx}$ and $a_{cory}$ are corrected when the input apparatus 1 is held almost still, with the result that the gravitational effect with respect to the acceleration sensor unit 16 can be suppressed. In addition, because the correction acceleration values $a_{corx}$ and $a_{cory}$ are corrected using Equations (1) and (2) upon update of the reference acceleration values $a_{refx}$ and $a_{refy}$, a DC level is also corrected, thereby solving the problem regarding the DC offset. Further, because the velocity values are corrected so as to be reset to 0 when the input apparatus 1 is held almost still, integration errors can also be suppressed. When an integration error is generated, a phenomenon in which the pointer 2 moves on the screen 3 irrespective of the fact that the user has stopped moving the input apparatus 1 occurs.

Figure 13:
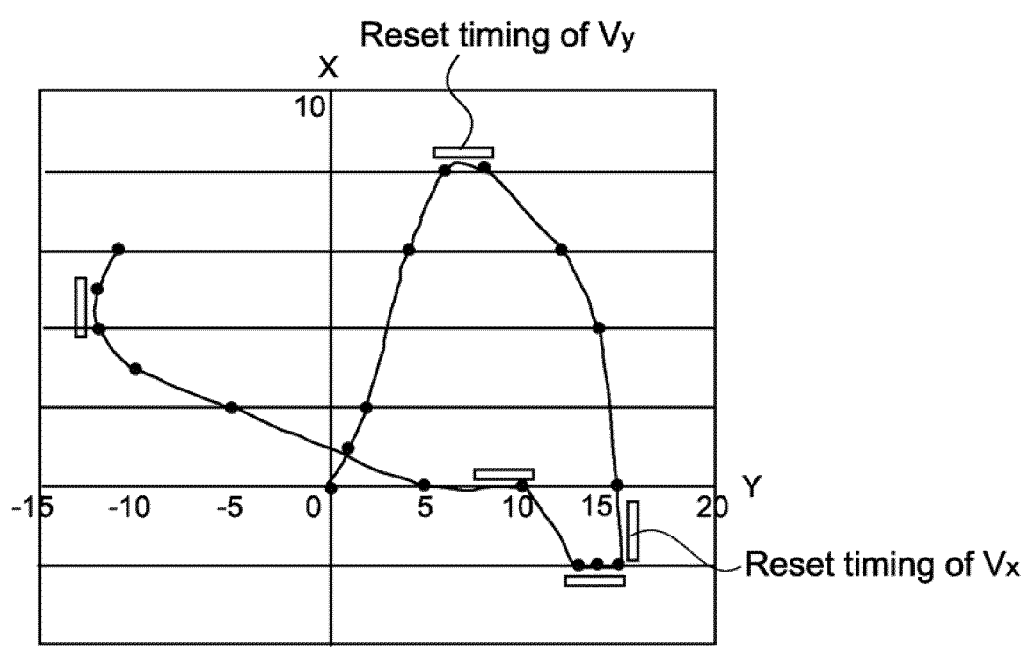
FIG. 13 A diagram showing a trajectory of the input apparatus seen from a plane formed by an X axis and a Y axis.

Moreover, in this embodiment, because the first reference acceleration value $a_{refx}$ and the second reference acceleration value $a_{refy}$ are updated individually, when even one of the angular acceleration values in the yaw direction and the pitch direction becomes smaller than the threshold value, a correction thereof is performed. Therefore, it is possible to update the first reference acceleration value $a_{refx}$ or the second reference acceleration value $a_{refy}$ with a time interval short enough for practical use. The same holds true for the individual corrections of the first velocity value $V_x$ and the second velocity value $V_y$. FIG. 13 is an explanatory diagram to help understand the above description.

FIG. 13 shows a trajectory of the input apparatus 1 seen from a plane formed by the X axis and the Y axis. $V_x$ is reset to 0 if the angular velocity value $\omega_y$ in the yaw direction is substantially 0 (smaller than the threshold value Th2). $V_y$ is reset to 0 if the angular velocity value $\omega_x$ in the pitch direction is substantially 0 (smaller than the threshold value Th2).

In the related art, in order to reduce the gravitational effect, there has been, in addition to an input apparatus 1 including six sensors, an apparatus that detects a change in a gravity vector per unit time using triaxial acceleration sensors to recognize roll and pitch angular velocities as XY displacement amounts. Although there is no problem concerning the Y-axis direction, because this apparatus is of a type that moves the pointer 2 in the X-axis direction based only on the twist or turn of a wrist of the user in the roll direction, the intuitional operation of the user is not matched.

Figure 14:
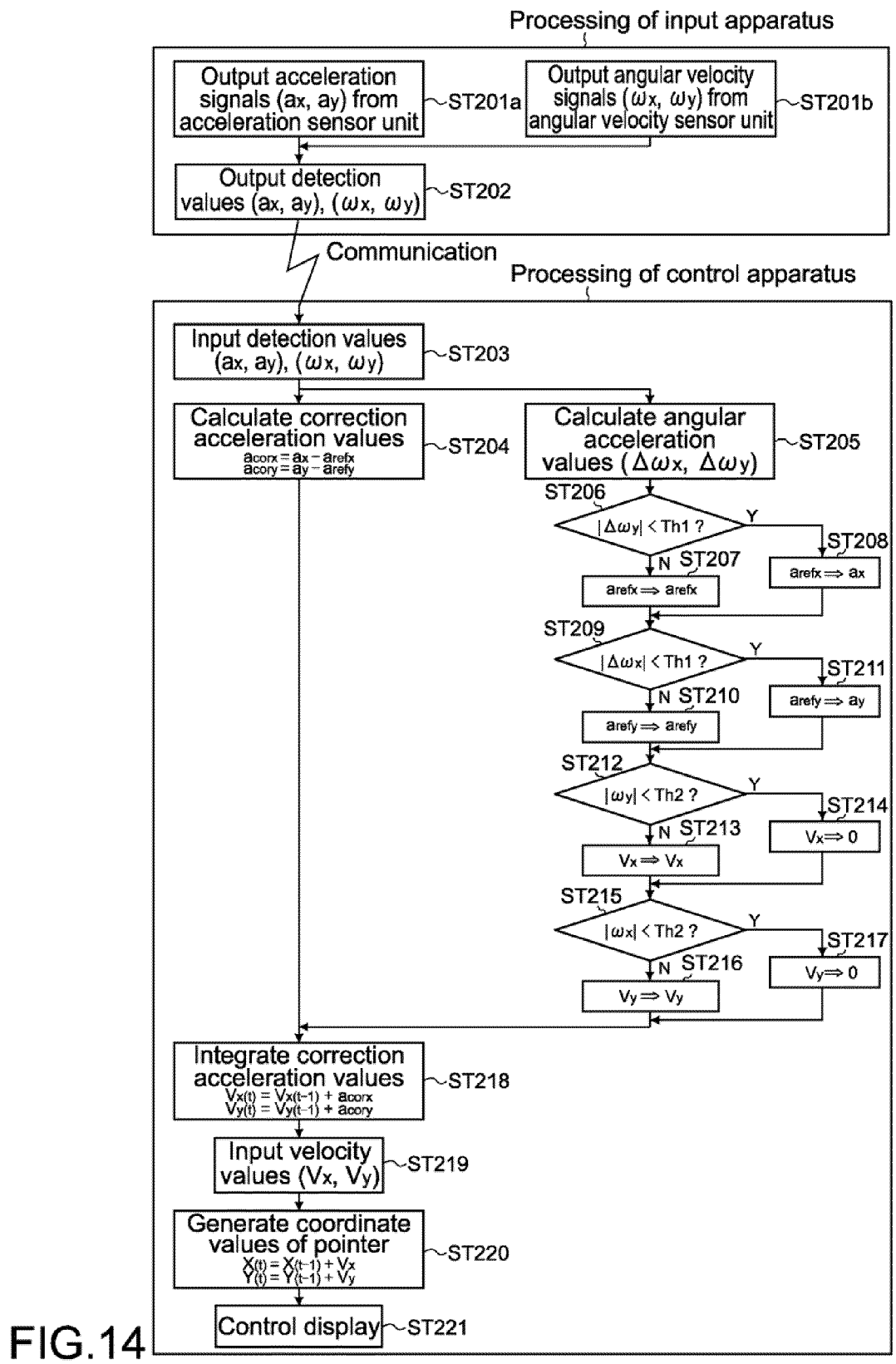
FIG. 14 A flowchart showing another embodiment.

FIG. 14 is a flowchart showing another embodiment described above. In the flowchart, the input apparatus 1 outputs, as the input information, to the control apparatus 40, the biaxial acceleration signals and biaxial angular velocity signals output from the sensor unit 17. The MPU 35 of the control apparatus 40 executes Steps 102a and 102b to 115 shown in FIG. 11 in Steps 204 to 218. Because details thereof are the same as that of FIG. 1, descriptions thereof will be omitted.

Next, an operation carried out when the icon 4 on the screen 3 of the display apparatus 5 is selected and executed using the input apparatus 1 will be described.

Figure 15:
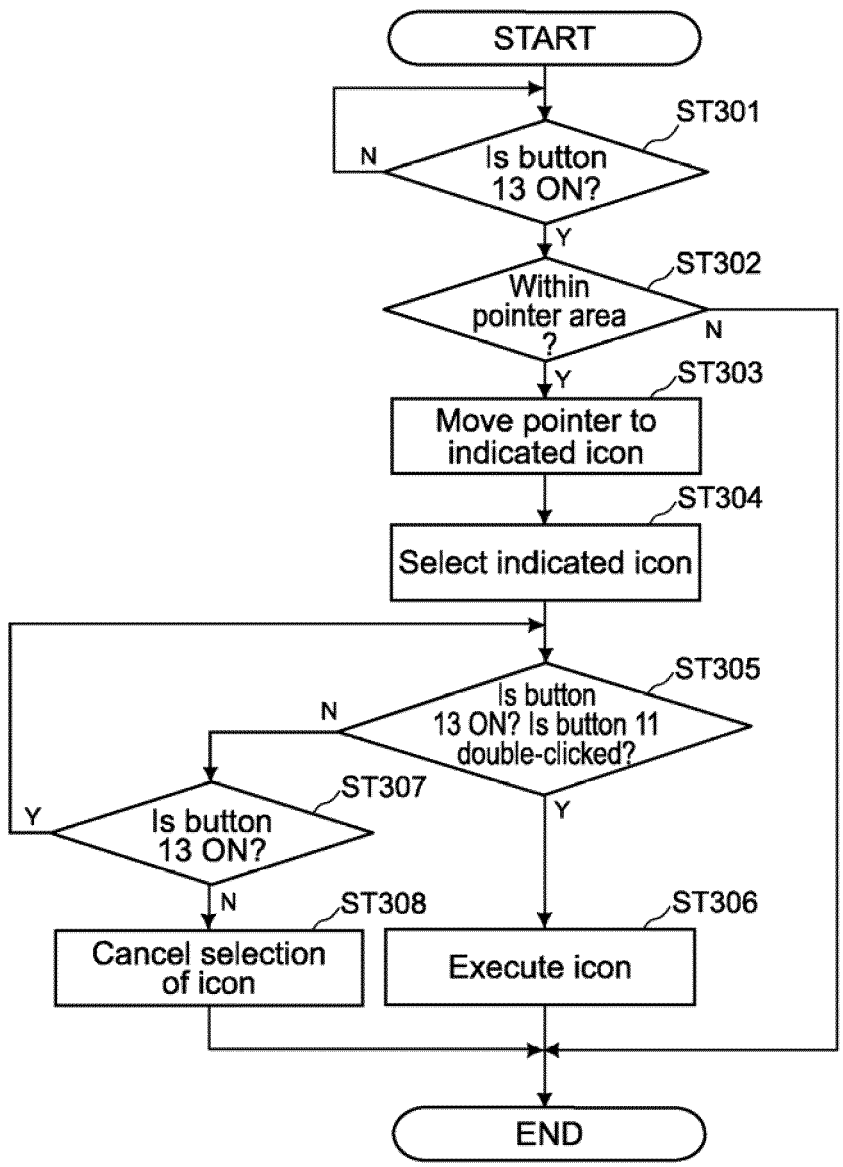
FIG. 15 A flowchart showing an operation of selecting and executing an icon on the screen by the input apparatus.
Figure 16:
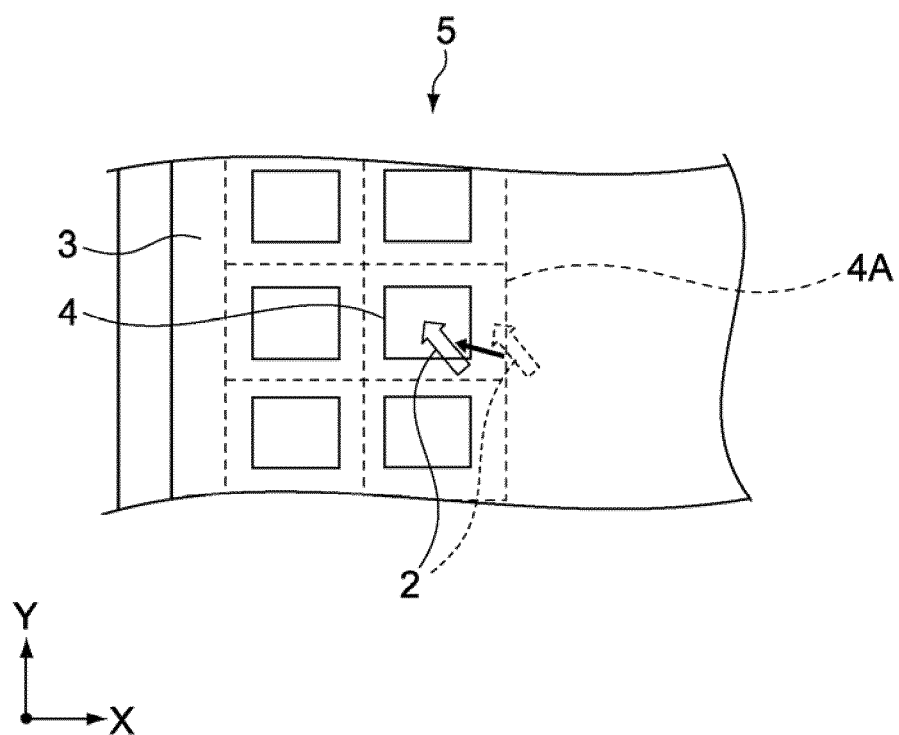
FIG. 16 A partially enlarged diagram of the screen 3 for illustrating the steps of restricting a movement of the pointer in the flowchart of FIG. 15.

FIG. 15 is a flowchart of the operation of selecting and executing the icon 4 on the screen 3 using the input apparatus 1. FIG. 16 is a partially enlarged diagram of the screen 3 for explaining steps of restricting the movement of the pointer 2 in the flowchart of FIG. 15.

First, based on the signal from the input apparatus 1 received by the receiver device 38, the MPU 35 of the control apparatus 40 judges whether the button 13 has been pressed (a movement recognition function (gyro function) of the input apparatus 1 has become ineffective) (Step 301).

When the button 13 has been pressed in Step 301 (when the movement recognition function of the input apparatus 1 is ineffective), it is judged whether the pointer 2 is indicating the area 4A around the icon 4 (Step 302).

When the pointer 2 is not indicating the area 4A, the processing is ended. On the other hand, when the pointer 2 is indicating the area 4A as indicated by the arrow in a dotted line of FIG. 16, the pointer 2 is moved so that the pointer 2 indicates the icon 4 as indicated by the arrow in a solid line of FIG. 16, and the movement of the pointer 2 is restricted (stopped) at that position (Step 303). The movement is controlled so that the pointer 2 is moved to the center of the icon 4 in accordance with the coordinates (X, Y) thereof, for example. As a result, a state where the pointer 2 is indicating the area 4A is easily shifted to a state where the icon 4 is indicated.

Next, the icon 4 indicated is set to be in a selected state (Step 304). At this time, the icon 4 may be colored black or a design of the icon 4 may be changed so that it can be seen that the icon 4 has been selected, for example.

Next, it is judged whether the button 13 is in the pressed state (the movement recognition function of the input apparatus 1 is ineffective) and the button 11 is double-clicked (Step 305).

When, in Step 305, the button 13 is in the pressed state (the movement recognition function of the input apparatus 1 is ineffective) and the button 11 is double-clicked, the icon 4 is executed based on execution information indicating the double-click (Step 306), and the processing is ended.

When, in Step 305, such a condition that the button 13 is pressed (the movement recognition function of the input apparatus 1 is ineffective) and the button 11 is double-clicked is not satisfied, it is judged whether the button 13 is in the pressed state (the movement recognition function of the input apparatus 1 is ineffective) (Step 307).

When the movement recognition function of the input apparatus 1 is ineffective in Step 307, the icon 4 is in a selected state, so the processing returns to Step 305.

When the button 13 is not in the pressed state (the movement recognition function of the input apparatus 1 is ineffective) in Step 307 (form of restriction cancel information), the selected state of the icon 4 is canceled (Step 308) and the processing is ended.

As described above, according to this embodiment, the control apparatus 40 input with, when the button 13 is pressed while the pointer 2 is indicating the area 4A around the icon 4 on the screen 3 as indicated by the arrow in a dotted line of FIG. 16, a signal indicating that the button 13 has been pressed and a signal of coordinate information of the pointer 2 at that time is provided, and the control apparatus 40 performs movement control so that the pointer 2 indicates the icon 4 as indicated by the arrow in a solid line of FIG. 16 based on those signals. Therefore, even when the pointer 2 is not directly indicating the icon 4, indicating the area 4A around the icon 4 can lead to indication of the icon 4, and the operability in selecting the icon 4 on the screen 3 by the pointer 2 can thus be improved.

Particularly when the input apparatus 1 including the button 13 is used by swinging it at a position distant from the display apparatus 5 as shown in FIG. 8, the influence of a hand movement can be eliminated and the icon 4 can be reliably selected.

Since the input apparatus 1 includes the button 13, by pressing the button 13 while the pointer 2 is indicating a position on the screen 3 other than the icons 4 and the surrounding areas 4A, for example, the function of recognizing the movement of the input apparatus 1 can be made ineffective. In other words, an operation corresponding to a "lift" operation of a mouse in the related art can be easily realized.

Next, another embodiment will be described. It should be noted that in this and subsequent embodiments, structures and the like similar to those of the above embodiments are denoted by the same reference symbols, and descriptions thereof will be omitted. Points different therefrom will mainly be described.

Figure 17:
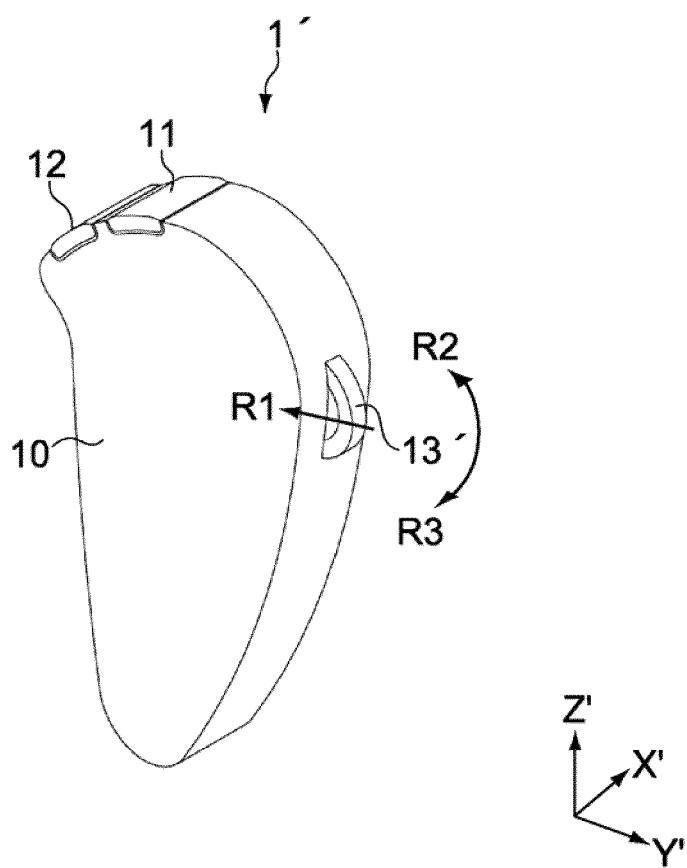
FIG. 17 A perspective diagram of an input apparatus according to another embodiment.

FIG. 17 is a perspective diagram of an input apparatus 1' of this embodiment.

As shown in FIG. 17, the input apparatus 1' includes a scroll dial button 13' in place of the button 13 shown in FIG. 2.

The scroll dial button 13' can be pressed in a first direction R1 so as to be pressed into the casing 10, and can be rotated in a second direction R2 and a third direction R3.

For example, when the scroll dial button 13' is pressed in the direction of the arrow R1, effectiveness/ineffectiveness of the function of recognizing the movement of the input apparatus 1' can be switched as in the case of the button 13 described above.

Figure 18:
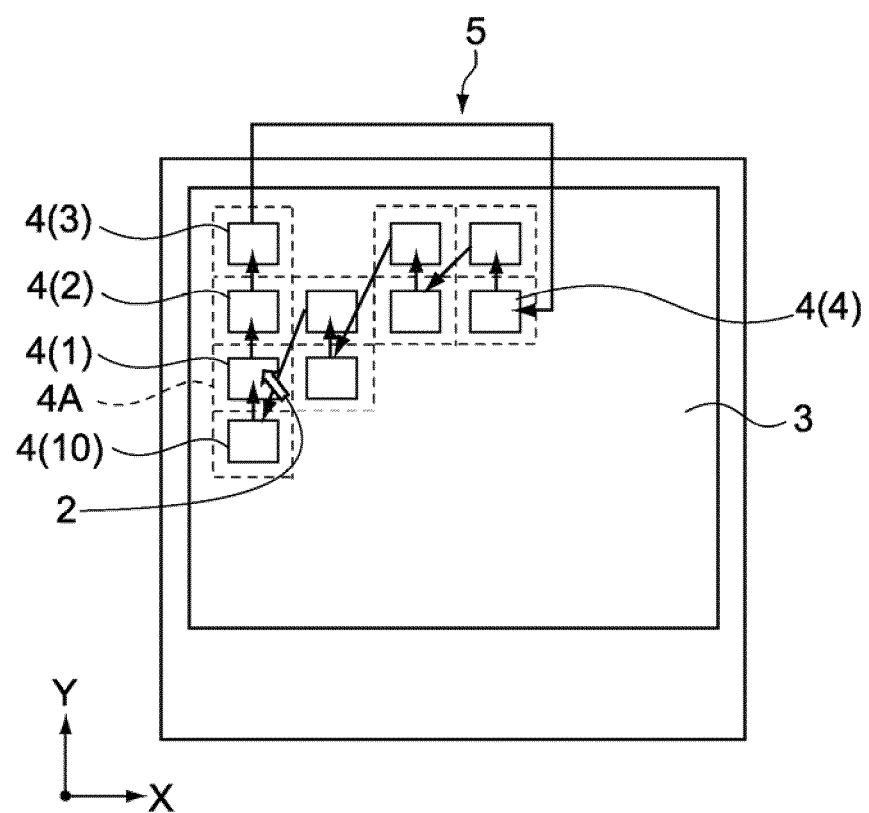
FIG. 18 A diagram for illustrating a method of selecting an icon using a scroll dial button.
Figure 19:
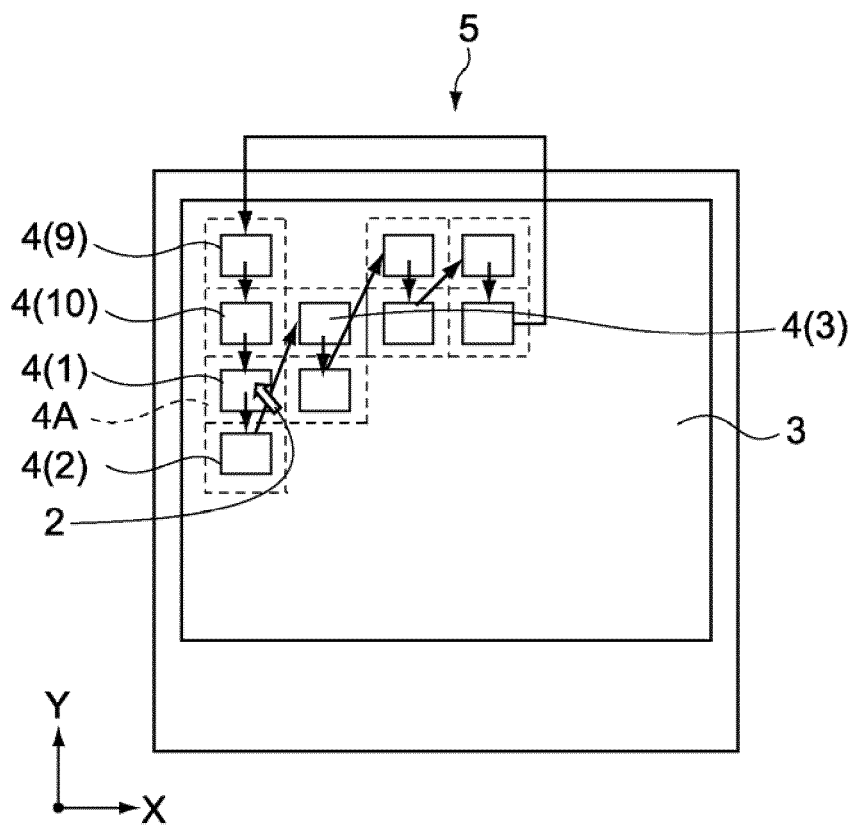
FIG. 19 A diagram for illustrating a method of selecting an icon using the scroll dial button.

FIGS. 18 and 19 are diagrams for illustrating a method of selecting the icon 4 using the scroll dial button 13'.

As shown in FIG. 18, when the scroll dial button 13' of the input apparatus 1' is rotated in the second direction R2 in a state where the pointer 2 has selected an icon 4(1), the icons are selected in the order of an icon 4(2), an icon 4(3), ... an icon 4(10), an icon 4(1) ....

As shown in FIG. 19, when the scroll dial button 13' of the input apparatus 1' is rotated in the third direction R3 in a state where the pointer 2 has selected an icon 4(1), the icons are selected in the order of an icon 4(2), an icon 4(3), ... an icon 4(10), an icon 4(1) ....

Next, a description will be given on an operation of selecting and executing the icon 4 using the scroll dial button 13'.

Figure 20:
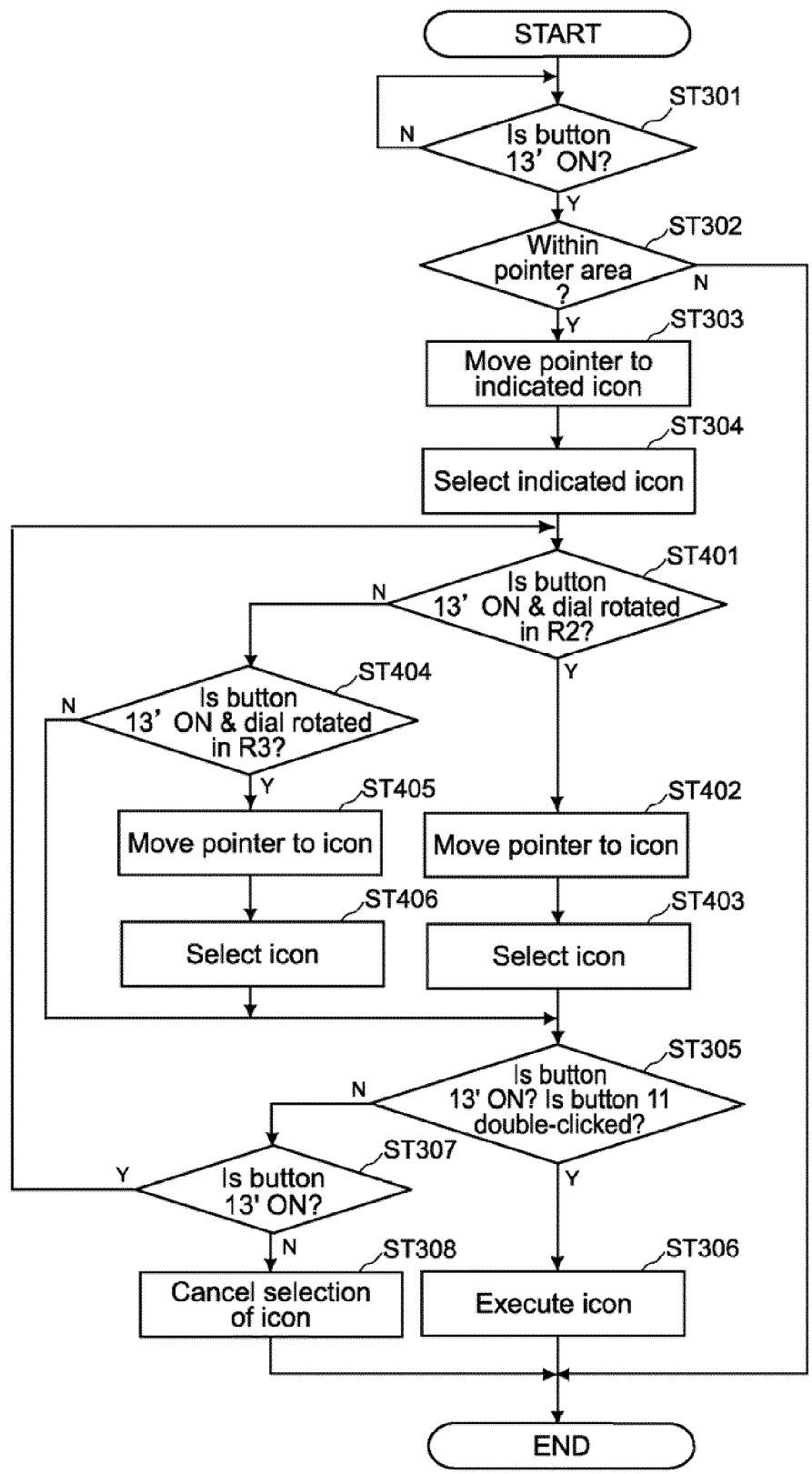
FIG. 20 A flowchart for illustrating an operation of selecting and executing an icon.

FIG. 20 is a flowchart illustrating the operation of selecting and executing the icon 4. It should be noted that Steps 301 to 304 and 305 to 308 are the same as those of the above embodiment, so descriptions thereof will be omitted.

As in the above embodiment, in a state where the icon 4(1), for example, is selected (Step 304), it is judged whether the scroll dial button 13' has been rotated in the second direction R2 (Step 401).

When the scroll dial button 13' is rotated in the second direction R2 in Step 401, based on the rotational amount thereof as second movement information, the pointer 2 is moved to the icon 4(2), the icon 4(3), or the like as shown in FIG. 18 (Step 402), and the icon 4(2), the icon 4(3), or the like is set to be in the selected state (Step 403). Then, the process advances to Step 305.

Meanwhile, when the scroll dial button 13' is not rotated in the second direction R2 in Step 401, it is judged whether the scroll dial button 13' has been rotated in the third direction R3 (Step 404).

When the scroll dial button 13' has been rotated in the third direction R3 in Step 404, based on the rotational amount thereof, the pointer 2 is moved to the icon 4(2), the icon 4(3), or the like as shown in FIG. 19 (Step 405), and the icon 4(2), the icon 4(3), or the like is set to be in the selected state (Step 406). Then, the process advances to Step 305.

When the scroll dial button 13' is not rotated in the third direction R3 in Step 404, the process advances to Step 305.

As described above, in this embodiment, the input apparatus 1' includes the scroll dial button 13', and the control apparatus 40 includes the receiver device 38 for receiving the second movement information of the scroll dial button 13' and the MPU 35 for controlling the pointer 2 to move from the selected icon 4(1) to another icon 4(2) in order, based on the second movement information.

Thus, when the scroll dial button 13' is rotated in the second direction R2 in the state where the icon 4(1) is selected by the pointer 2 (Step 304), the information on the rotational amount of the scroll dial button 13' as the second movement information is input to the control apparatus 40, and based on the second movement information, the MPU 35 can move the pointer 2 from the selected icon 4(1) to another icon 4(2) or the like in the order shown in FIG. 18.

Therefore, by rotating the scroll dial button 13' when another icon 4(10) near the icon 4(1) is erroneously indicated, the pointer 2 can be moved to the icon 4(1) in the order shown in FIG. 18 or 19, whereby the desired icon 4(1) can be easily selected.

Further, as compared to a mouse including a left button, a right button, and a scroll dial button in the related art, because additional parts are unnecessary, cost reduction can be realized.

It should be noted that in this embodiment, the example in which the scroll dial button 13' is rotated when the icon 4(1) is selected has been shown. However, the same holds true also for a case where another icon is initially selected. Further, the example in which the icons 4 are first selected in order in the vertical direction of the screen 3 and subsequently selected in order in the lateral direction of the screen 3 has been shown, but the order of selection is not limited.

Next, another embodiment will be described.

Figure 21:
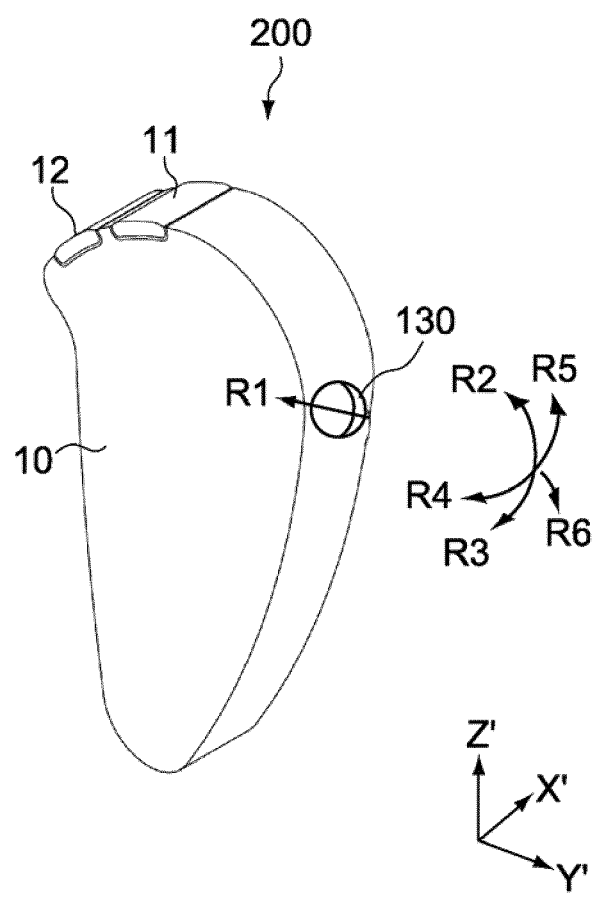
FIG. 21 A perspective diagram of an input apparatus according to another embodiment.

FIG. 21 is a perspective diagram of the input apparatus of this embodiment.

As shown in FIG. 21, an input apparatus 200 includes a ball-like button 130 in place of the button 13 shown in FIG. 2.

The button 130 can be pressed in the first direction R1 so as to be pressed into the casing 10, and can rotate in various directions such as the second direction R2, the third direction R3, a fourth direction R4, and a fifth direction R5.

When the button 130 is pressed in the direction of the arrow R1, effectiveness/ineffectiveness of a function of recognizing a movement of the input apparatus 200 can be switched as in the case of the button 13 described above, for example.

Figure 22:
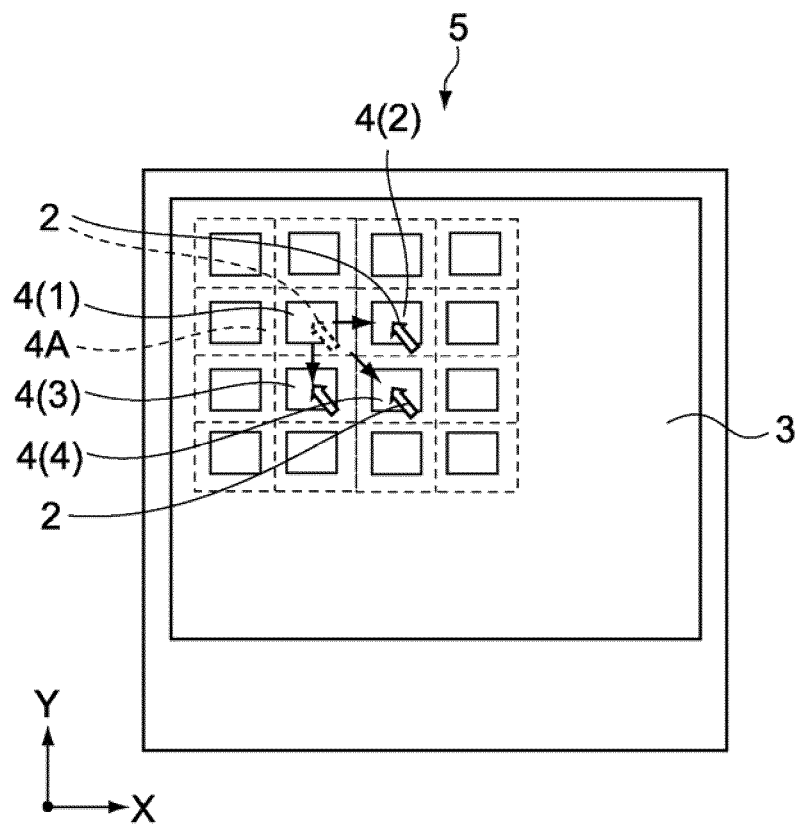
FIG. 22 A diagram for illustrating a method of selecting an icon using a ball-like button.

FIG. 22 is a diagram for illustrating a method of selecting the icon 4 using the button 130.

As shown in FIG. 22, when the button 130 of the input apparatus 200 is rotated in the fifth direction R5 in a state where the icon 4(1) is selected by the pointer 2, the icon 4(2) is selected. When the button 130 is rotated in the third direction R3, the icon 4(3) is selected. When the button 130 is rotated in a sixth direction R6 between the third direction R3 and the fifth direction R5, the icon 4(4) is selected.

With such a structure, as in the above embodiments, by rotating the button 130 when the icon 4(1) is selected, the pointer 2 can be moved to any of other arbitrary icons 4(2) to 4(4) and the like around the icon 4(1). In the case of this embodiment, because the button 130 can be rotated in various directions, a change can easily be made to an icon wished to be selected, in a shortest distance.

Figure 23:
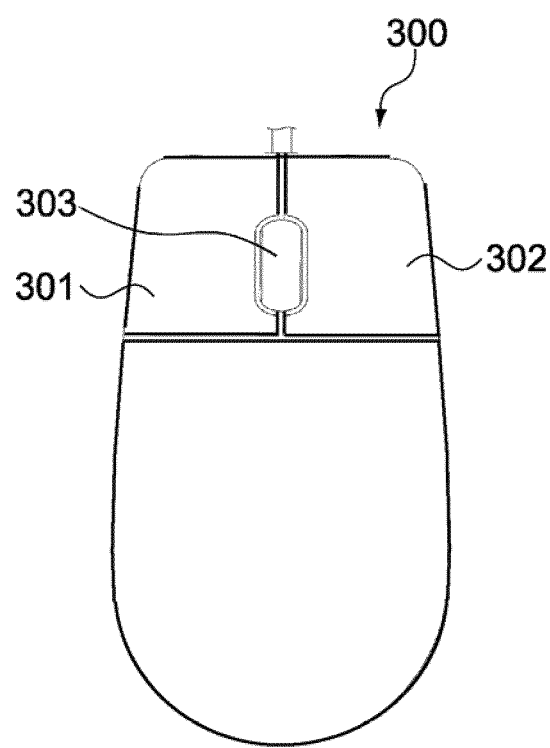
FIG. 23 A plan view of a mouse to which the present embodiment is applied.

In the above embodiments, the 3-dimensional pointing device has been described as an example of the input apparatus. However, the present invention can of course be applied to a mouse. FIG. 23 is a plan view of the mouse.

As shown in FIG. 23, for example, the function of the button 13 may be provided to a mouse 300 of the related art that includes a left button 301, a right button 302, a scroll dial button 303, and the like. For example, a function of switching effectiveness/ineffectiveness of a function of recognizing a movement of the mouse 300, which is the function of the button 13, may be provided to the right button 302 or the scroll dial button 303.

Subsequently, an input apparatus according to another embodiment will be described.

Figure 24:
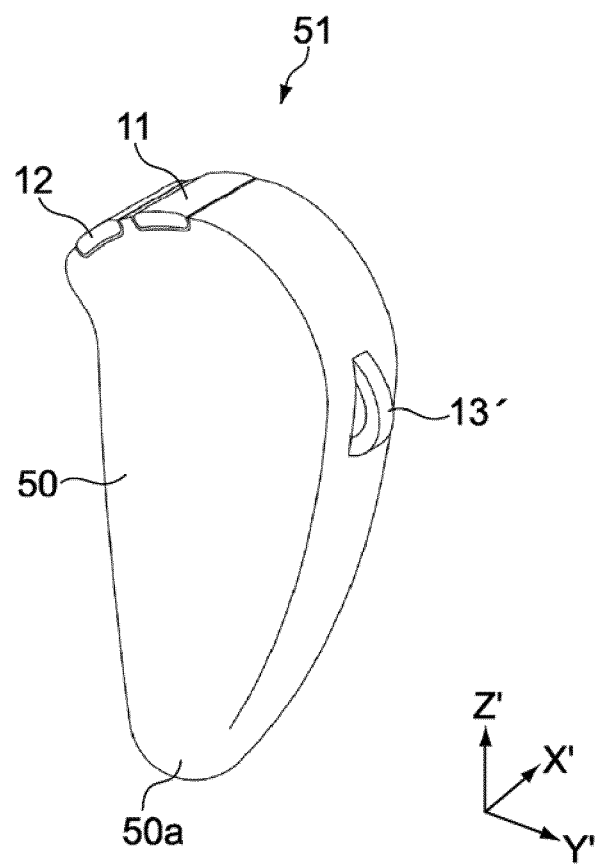
FIG. 24 A perspective diagram showing an input apparatus according to another embodiment.
Figure 25:
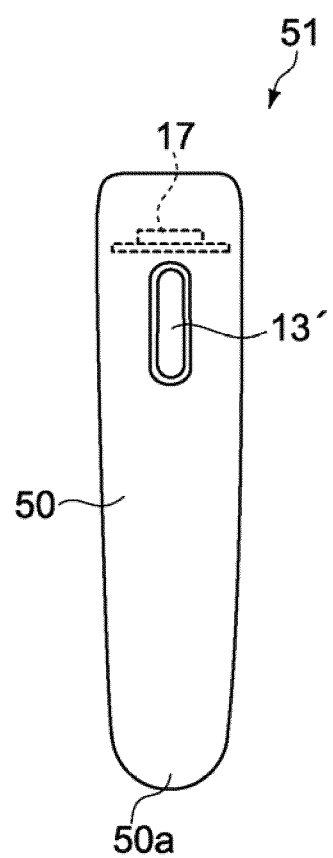
FIG. 25 A side view of the input apparatus shown in FIG. 24 seen from a rotary button side.

FIG. 24 is a perspective diagram showing an input apparatus 51. FIG. 25 is a side view of the input apparatus 51 seen from the scroll dial button 13' side. In the following, descriptions on components, functions, and the like similar to those of the input apparatus 1 according to the embodiment shown in FIG. 2 and the like will be simplified or omitted, and points different therefrom will mainly be described.

A casing 50 of the input apparatus 51 includes a partial sphere or partial quadric surface 50a provided at a predetermined position on a surface of the casing 50. Hereinafter, the partial sphere or quadric surface (50a) will be referred to as "lower curved surface" (50a) for convenience.

The lower curved surface 50a is formed at a position almost opposite to the buttons 11 and 12, that is, a position where, when a user holds the input apparatus 51, a pinky is located closer to the lower curved surface 50a than other fingers. Alternatively, in a case where, in the casing 50 elongated in one direction (Z'-axis direction), the sensor unit 17 is provided on a positive side of the Z' axis with respect to a longitudinal center of the casing 50 in the Z'-axis direction, the lower curved surface 50a is provided on a negative side of the Z' axis.

Typically, the partial sphere is substantially a hemisphere, but does not necessarily have to be a hemisphere. The quadric surface is a curved surface obtained by expanding a 2-dimensional conic curve (quadric curve) into a 3-dimensional conic curve. Examples of the quadric surface include an ellipsoid surface, an ellipsoid paraboloid surface, and a hyperbolic surface.

Figure 26:
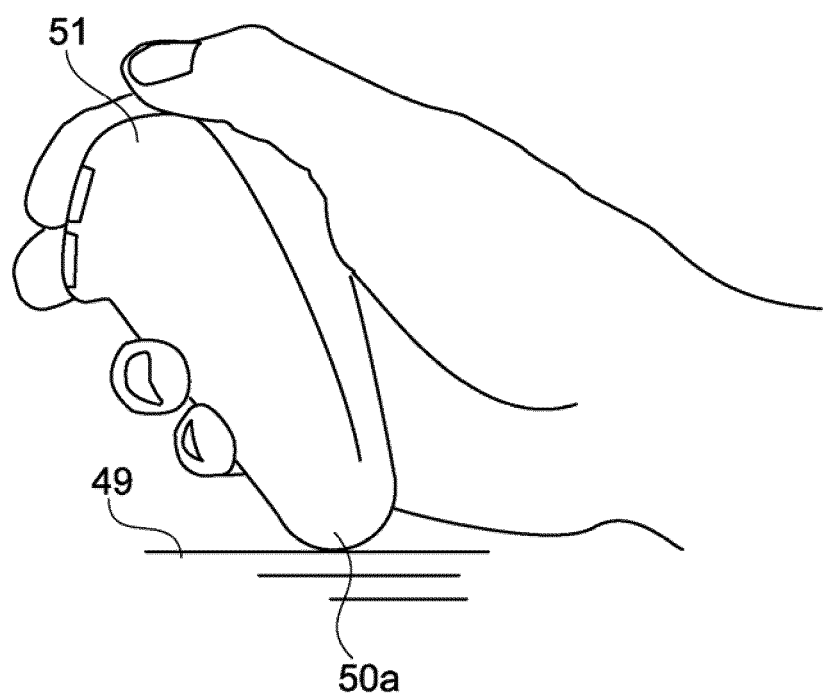
FIG. 26 A diagram showing a state where the user operates the input apparatus while a lower curved surface is in contact with a knee thereof.

With the configuration of the casing 50 of the input apparatus 51 as described above, a user can easily operate the input apparatus 51 while causing the lower curved surface 50a of the input apparatus 51 as a fulcrum to abut on a table, a chair, a floor, a knee or thigh of a user, and the like (hereinafter, referred to as abutment target object 49). That is, even in the state where the lower curved surface 50a of the input apparatus 51 is abutted on the abutment target object 49, the user can easily tilt the input apparatus 51 in diverse angles, thereby enabling delicate operations such as placing the pointer on the icon. FIG. 26 is a diagram showing the state where the user operates the input apparatus 51 while causing the lower curved surface 50a to abut on the knee.

Alternatively, in this embodiment, erroneous operations due to a shake of a hand, which cannot be suppressed by a shake correction circuit, can be prevented from occurring, and the user is free from fatigue that is caused when the user operates the input apparatus 51 in the air.

Figure 27:
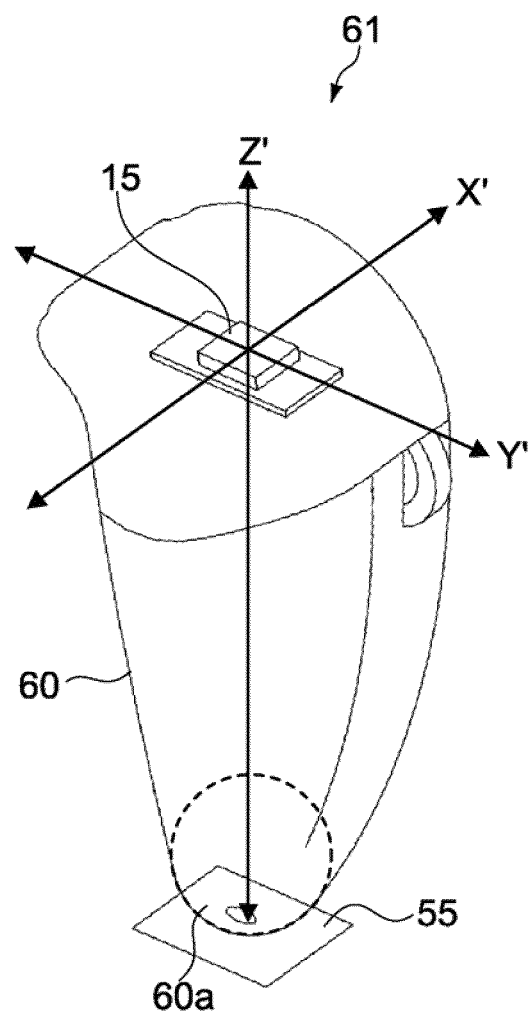
FIG. 27 A perspective diagram showing an input apparatus according to another embodiment.

FIG. 27 is a perspective diagram of an input apparatus according to still another embodiment of the present invention.

A casing 60 of an input apparatus 61 includes, similar to the input apparatus 51 shown in FIGS. 24 and 25, a lower curved surface 60a constituted of a partial sphere. A plane perpendicular to a maximum length direction (Z'-axis direction) of the casing 60 of the input apparatus 61 and is in contact with the lower curved surface 60a (hereinafter, referred to as lower end plane 55 for convenience) is substantially parallel to a plane formed by the X axis and the Y axis (see FIG. 5) as detection axes of the angular velocity sensor unit 15 (X-Y plane).

With the structure of the input apparatus 61 as described above, in a case where an operation is made by the user while the lower curved surface 60a is abutted on the lower end plane 55, angular velocities applied to the input apparatus 61 are input to the angular velocity sensor unit 15 as they are. Thus, an amount of calculation required to obtain detection values from the detection signals from the angular velocity sensor unit 15 can be reduced.

Figure 28:
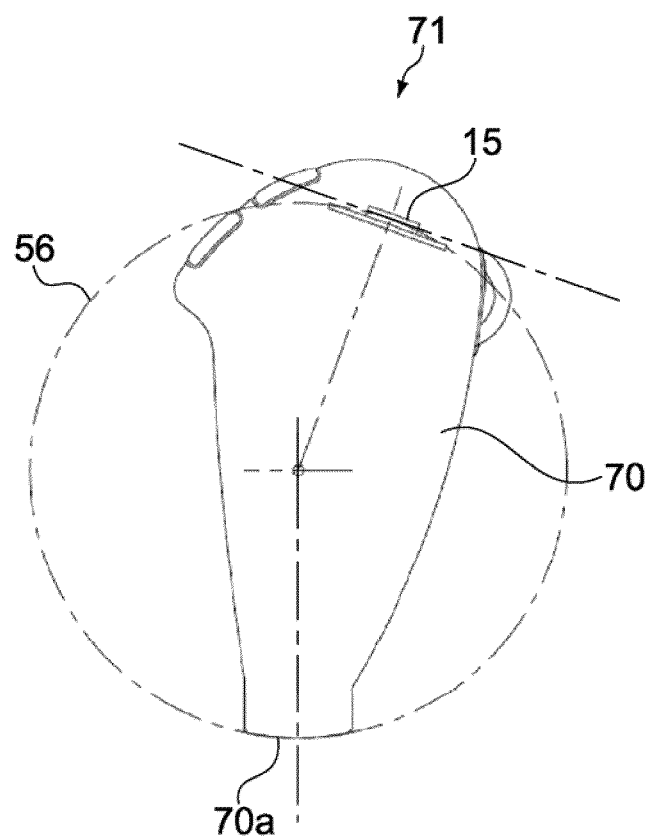
FIG. 28 A plan view showing an input apparatus according to another embodiment.
Figure 29:
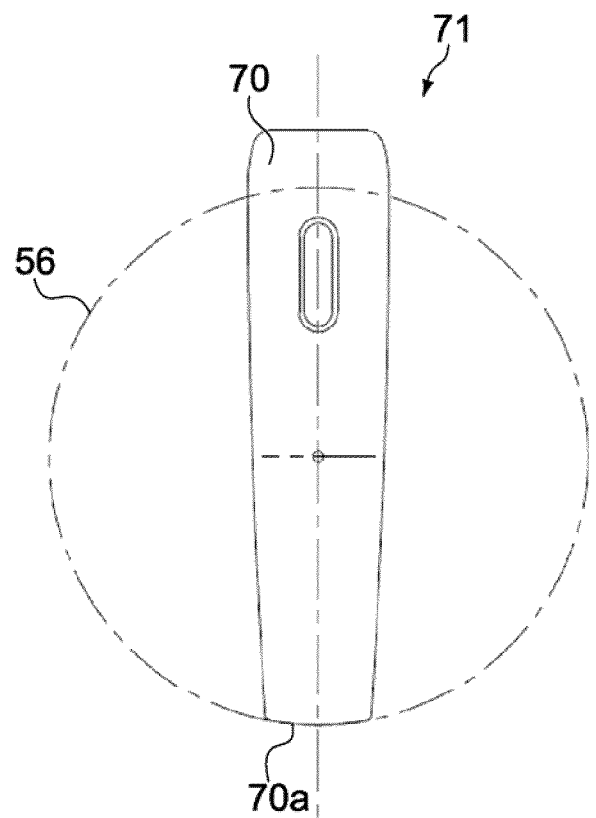
FIG. 29 A side view showing the input apparatus shown in FIG. 28.

FIG. 28 is a plan view showing an input apparatus according to another embodiment. FIG. 29 is a side view showing the input apparatus.

A lower curved surface 70a of a casing 70 of an input apparatus 71 is, for example, a partial sphere. The lower curved surface 70a is set with a larger curvature radius than the lower curved surfaces 50a and 60a of the input apparatuses 51 and 61 shown in FIGS. 24 and 27. The angular velocity sensor unit 15 is provided at a position at which a straight line contained in the X-Y plane formed by the X axis and the Y axis as the detection axes of the angular velocity sensor unit 15 corresponds to a tangent line of a virtually-drawn circle 56 that passes the partial sphere when seen from the X- and Y-axis directions. As long as the condition as described above is satisfied, the angular velocity sensor unit 15 may be arranged in the casing 70 such that the X-Y plane of the angular velocity sensor unit 15 is tilted with respect to a longitudinal direction of the input apparatus 71 (see FIG. 28).

Accordingly, because a direction of the vector of the angular velocity generated when the user operates the input apparatus 71 while abutting the lower curved surface 70a thereof on the abutment target object 49 and the detection direction of the angular velocity sensor unit 15 match, a linear input is thus enabled.

Figure 30:
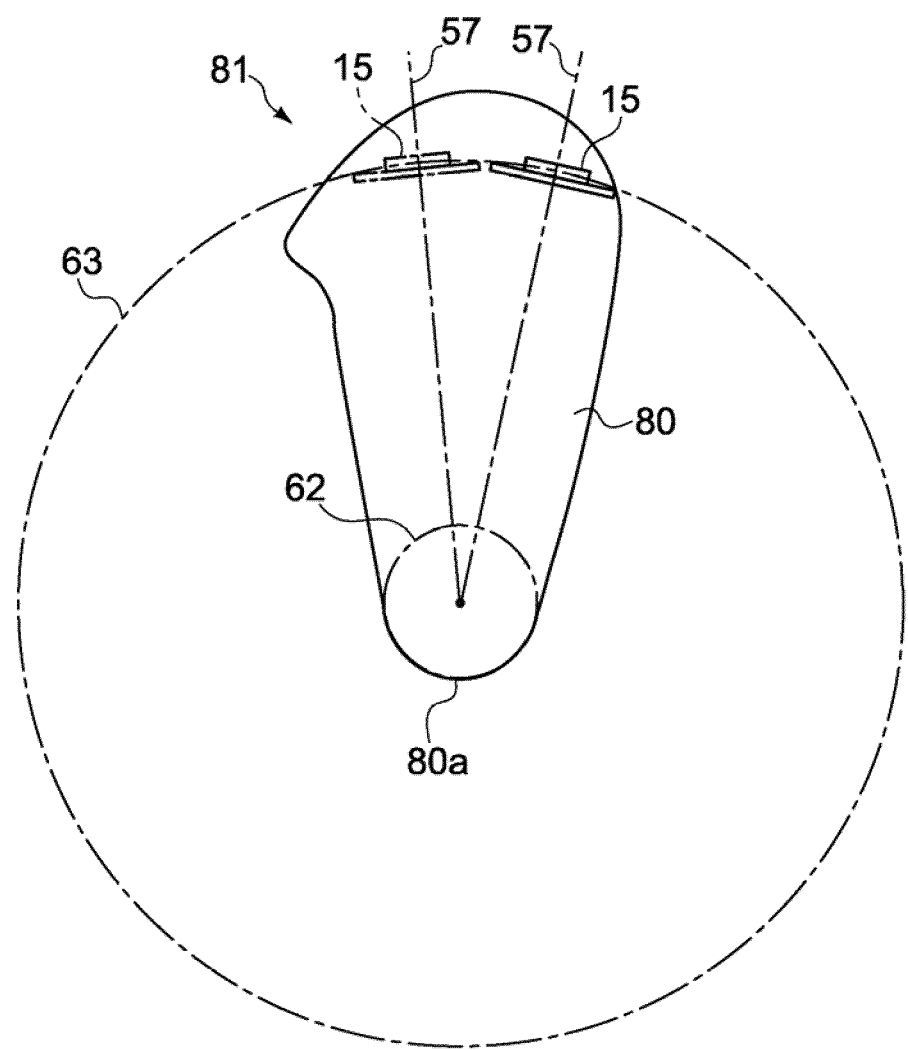
FIG. 30 A plan view showing an input apparatus according to another embodiment.

FIG. 30 is a plan view of an input apparatus according to another embodiment.

A sphere as a lower curved surface 80a of a casing 80 of an input apparatus 81 has a curvature radius the same as or close to that shown in FIG. 27, for example. Regarding the angular velocity sensor unit 15, a virtual straight line that passes an intersection of the X axis and the Y axis, which is a center point of the angular velocity sensor unit 15, and is orthogonal to the X axis and the Y axis passes a center point O of a first sphere 62 including the lower curved surface 80a. With the structure as described above, the first sphere 62 including the lower curved surface 80a and a second sphere 63 in which the straight line contained in the X-Y plane of the angular velocity sensor unit 15 becomes a tangent line are arranged concentrically. Therefore, the input apparatus 81 bears the same effect as the input apparatus 71 shown in FIG. 28.

It should be noted that the input apparatus 51, 61, 71, or 81 including the partial sphere or the partial quadric surface described above does not necessarily need to be operated by the user while the lower curved surface 50a, 60a, 70a, or 80a thereof is abutted against the abutment target object 49, and may of course be operated in air.

Various modifications can be made to the above embodiments.

The processing flow described in FIG. 15 can also be applied to, for example, a case where the pointer has moved to the area 4A to be placed on a first icon and a case of moving to a second icon adjacent to the first icon. Specifically, the processing flow described in FIG. 15 may also be applied to a case where the pointer has moved from the first icon 4 that has been selected to the second icon 4 (or moved to the third or subsequent icon 4).

In the descriptions of the above embodiments, as a form of the restriction cancel information, the information indicating that the pressing of the button 13, 13', or the like has been released has been taken as an example. However, as another form of the restriction cancel information, information indicating that the velocity, acceleration, or angular velocity of the input apparatus 1 has exceeded a threshold value may be used as the restriction cancel information. Specifically, for example, the movement of the pointer 2 may be controlled such that, in a case where, after the pointer 2 is temporarily restrained on the icon 4 and the movement is thus restricted, the user moves the input apparatus at a predetermined velocity, acceleration, angular velocity, or the like, the restraint is released and the pointer 2 is moved away from the icon 4.

As restriction cancel information according to another embodiment, a case where a certain gesture is made when the user moves the input apparatus 1 while holding the input apparatus 1 is given. In this case, the movement restriction only needs to be canceled when the gesture of the user matches or is close to gesture information stored in advance in the input apparatus 1 or the control apparatus 40. Typically, the gesture information is information on the movement of the casing 10 that the user has registered in advance, for example. A certain gesture is a movement of swinging the casing 10 a predetermined number of times, a movement of the user signing his/her own autograph, other movements of writing/drawing letters and figures, and the like. Control may also be performed such that, by the certain gesture, the pointer 2 is moved from the first icon currently being restrained upon to the second icon adjacent thereto.

Although the input apparatuses 1, 1', 200, 15, and the like of the above embodiments have transmitted the input information to the control apparatus wirelessly, the input information may be transmitted by wire.

The present embodiments may also be applied to, for example, a handheld information processing apparatus in which the input apparatus (or 1', 200, 15, etc.), the control apparatus 40, and the display apparatus 5 are integrated. Examples of the handheld information processing apparatus include a PDA (Personal Digital Assistance), a cellular phone, a portable music player, and a digital camera.

In the above embodiments, the pointer 2 that moves on the screen in accordance with the movement of the input apparatus 1, 51, or the like has been represented by an image of an arrow. However, the image of the pointer 2 is not limited to the arrow, and a simple circle, square, and the like, or a character image or other images may be used instead.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by the calculation that uses the trigonometric function.

An angle sensor or an angular acceleration sensor may be used instead of the angular velocity sensor unit 15. As the angle sensor, there are a geomagnetic sensor, an image sensor, and the like. When using a triaxial geomagnetic sensor, for example, a change amount of an angle value is detected. Therefore, in this case, the angular velocity value can be obtained by subjecting the angle value to a derivation operation. The angular acceleration sensor is constituted of a combination of a plurality of acceleration sensors, and the angular velocity value can be obtained by subjecting the angular acceleration value obtained by the angular acceleration sensor to an integration operation.

FIG. 11 has shown the calculation method of the velocity values $(V_x, V_y)$. However, the present invention is not limited thereto, and the MPU 19 may calculate the velocity values $(V_x, V_y)$ corresponding to the angular velocity values detected by the angular velocity sensor unit 15. For example, the velocity values corresponding to the angular velocity values are velocity values calculated by a predetermined operational expression (function of angular velocity values and velocity values), or velocity values read out from the memory using a lookup table. In this case, the acceleration values $(a_x, a_y)$ obtained by the acceleration sensor unit 16 do not have to be used.

For example, in the above embodiments, display has been controlled such that the pointer 2 is drawn to the icon 4. However, display may be controlled such that, when the pointer 2 is placed inside the area 4A, the icon 4 is displayed with emphasis. The display with emphasis means that at least one of a design and size of the icon 4 is changed. The design of the icon 4 refers to a color, pattern, shape, and the like. When the pointer 2 closes in on the icon 4, for example, indication is made such that the color is changed, or the like. Display may also be controlled such that the size of the icon 4 is made larger than before so that a part of the icon 4 is positioned on the coordinates of the pointer 2 (this is included in the emphasis display of the icon 4).

In addition, control of moving the entire icon 4 may be executed such that, when the pointer 2 is positioned inside the area 4A, a predetermined coordinate position inside the image of the icon 4 is positioned at a coordinate position of the pointer 2.

Alternatively, when the pointer 2 is positioned inside the area 4A, the pointer 2 may be displayed with emphasis. In this case, similar to the emphasis display of the icon 4, at least one of a design and size of the pointer 2 only needs to be changed, like the pointer 2 is extended to the icon 4, for example.

The movement of the pointer 2 may also be controlled such that a movement sensitivity of the pointer 2 is improved as the pointer 2 comes closer to the coordinates of the icon 4. The closer the position of the pointer 2 is to the coordinates of the icon 4, the more slightly the user needs to move the input apparatus 1 to move the pointer 2 a large distance.

For changing the movement sensitivity as described above, for example, the MPU 35 of the control apparatus 40 only needs to calculate, as new velocity values, $(\alpha V_x, \beta V_y)$ that are values obtained by multiplying the velocity values $(V_x, V_y)$ for moving the icon 4 by coefficients $(\alpha, \beta)$. Then, the MPU 35 only needs to generate coordinate values of the pointer 2 based on the new velocity values. The coefficients $(\alpha, \beta)$ only need to be real numbers or integers. In this case, for example, it is only necessary that a function in which the coefficients $(\alpha, \beta)$ decrease as the pointer 2 moves farther away from coordinate values of a center of the image of the icon 4 (or coordinate values at a predetermined position within the image of the icon 4) on the screen be used. The function may be a linear function, a function of quadratic or more, or an exponent function.

It is also possible to use either one of the coefficients $\alpha$ and $\beta$. In other words, the movement sensitivity in either one of the X-axis direction and the Y-axis direction on the screen may be variable.

The degree by which the pointer 2 is drawn to the icon 4 may be changed in accordance with a use frequency (e.g., use count) of the icon 4 by the user. For example, the MPU 35 of the control apparatus 40 counts a use count of the first icon and a use count of the second icon from among the plurality of icons 4, and stores those count values in the nonvolatile memory. When the use count of the first icon is equal to or smaller than predetermined, even when a distance of the pointer 2 from the coordinate values of the first icon and a distance of the pointer 2 from the coordinate values of the second icon used more than a predetermined number of times are the same, the movement sensitivity of the second icon only needs to be set higher than that of the first icon.

It is also possible for the MPU 35 to variably set the movement sensitivity of the pointer 2 from the coordinate positions of the icons 4, for each of multiple stages into which the use frequency is divided.

It is also possible to control detachability of the pointer 2 from the icon 4. For example, the larger the use count of the first icon is, the lower the movement sensitivity of the pointer 2 from the first icon (or the area 4A around the first icon) is, that is, it becomes harder to move away.

The use count may be, for example, the number of times an operation of executing a file, which is an operation of opening a file corresponding to the icon or activating an application program corresponding to the icon, is carried out. However, the present invention is not limited thereto, and an icon selection operation, a drag operation, a copy operation, or a combination of those may be included in the use count.

An information processing apparatus includes an input means for inputting movement information for moving on a screen a pointer for selecting a target object from the plurality of target objects displayed on the screen, and a control means for controlling the movement of the pointer on the screen by multiplying the movement information input by the input means by a coefficient that changes in accordance with a distance between the target object and the pointer on the screen.

Alternatively, an information processing apparatus includes an input means for inputting movement information for moving on a screen a pointer for selecting a target object from a plurality of target objects displayed on the screen, and a control means for controlling the movement of the pointer on the screen by multiplying the movement information input by the input means by a coefficient that changes in accordance with a use frequency of the target object.

The information processing apparatus may be the input apparatus 1, the control apparatus 40, or the handheld information processing apparatus that includes a display as well as a combination of those two.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information processing apparatus comprising:
   a video RAM to display on a screen a plurality of target objects and a pointer for selecting a target object from the plurality of target objects;
   a receiver device to input first movement information for moving the pointer on the screen, movement restriction information for moving, when the pointer is indicating a predetermined area around the target object on the screen, the pointer such that the pointer indicates the target object, and restricting the movement of the pointer at the predetermined area such that the pointer is stopped and a movement recognition function is ineffective to move the pointer, and execution information for executing, by the pointer, the target object indicated by the pointer on the screen; and
   a microprocessor to perform movement control of the pointer and execution control of the target object based on the first movement information, the movement restriction information, and the execution information input by the receiver device, wherein
   when the movement of the pointer has been restricted and is stopped while indicating the target object on the screen, the receiver device inputs second movement information for moving the pointer from the target object indicated by the pointer to another target object in a predetermined order configured to only cycle through the target objects in a stepwise fashion; and
   the microprocessor performs the movement control of the pointer based on the second movement information.

2. The information processing apparatus according to claim 1, wherein
   the receiver device inputs third movement information for moving, when the movement of the pointer is restricted while indicating the target object on the screen, the pointer to another target object around the target object indicated by the pointer; and
   the microprocessor performs the movement control of the pointer based on the third movement information.

3. The information processing apparatus according to claim 1, wherein
   the receiver device inputs restriction cancel information for canceling the restriction on the movement of the pointer whose movement is restricted; and
   the microprocessor performs the movement control of the pointer based on the restriction cancel information.

4. The information processing apparatus according to claim 1,
   wherein the movement restriction information contains information for moving the pointer such that the pointer indicates the another target object, and restricting the movement of the pointer at the predetermined area.

5. The information processing apparatus according to claim 2,
   wherein the movement restriction information contains information for moving the pointer such that the pointer indicates the another target object, and restricting the movement of the pointer at the predetermined area.

6. The information processing apparatus according to claim 3, further comprising:
   an input apparatus that is operated by a user, and a button provided to the input apparatus for the user to make a switch as to whether or not to let the input apparatus recognize a movement of the input apparatus, wherein
   the microprocessor performs the movement control of the pointer based on, as the restriction cancel information, an operation signal of the button caused by the user.

7. The information processing apparatus according to claim 3,
   wherein the microprocessor performs the movement control of the pointer based on the first movement information as the restriction cancel information.

8. An information processing apparatus comprising:
   a video RAM to display on a screen a plurality of target objects and a pointer for selecting a target object from the plurality of target objects;
   a receiver device to input first movement information for moving the pointer on the screen, movement restriction information for moving, when the pointer is indicating a predetermined area around the target object on the screen, the pointer such that the pointer indicates the target object and restricting the movement of the pointer at the predetermined area, and restricting, when the pointer is indicating the target object, the movement of the pointer from the target object to outside the target object such that a movement recognition function is ineffective to move the pointer outside the target object, and execution information for executing, by the pointer, the target object indicated by the pointer on the screen; and
   a microprocessor to perform movement control of the pointer and execution control of the target object based on the first movement information, the movement restriction information, and the execution information input by the receiver device, wherein
   when the movement of the pointer has been restricted and is stopped while indicating the target object on the screen, the receiver device inputs second movement information for moving the pointer from the target object indicated by the pointer to another target object in a predetermined order configured to only cycle through the target objects in a stepwise fashion; and
   the microprocessor performs the movement control of the pointer based on the second movement information.

9. An input apparatus operating a pointer for selecting a target object from a plurality of target objects displayed on a screen, the input apparatus comprising:
- a first operation section to input first movement information for moving the pointer on the screen;
- a second operation section to input movement restriction information for moving, when the pointer is indicating a predetermined area around the target object on the screen, the pointer such that the pointer indicates the target object, and restricting the movement of the pointer at the predetermined area such that the pointer is stopped and a movement recognition function of the first operation section is ineffective to move the pointer;
- a third operation section to input execution information for executing the target object indicated by the pointer on the screen; and
- a fourth operation section to input second movement information for, when the movement of the pointer has been restricted and is stopped while indicating the target object on the screen, moving the pointer from the target object indicated by the pointer to another target object in a predetermined order configured to only cycle through the target objects in a stepwise fashion.

10. The input apparatus according to claim 9, wherein the first operation section recognizes a movement of the input apparatus, and the recognized movement is input as the first movement information.

11. The input apparatus according to claim 9, wherein
- the second operation section and the fourth operation section are constituted of a single scroll dial button;
- the second operation section performs the input when the scroll dial button is pressed; and
- the fourth operation section performs the input when a scroll dial of the scroll dial button is rotated.

12. The input apparatus according to claim 9, further comprising
- a fifth operation section to input third movement information for moving, when the movement of the pointer is restricted while indicating the target object on the screen, the pointer to another target object around the target object indicated by the pointer.

13. An input apparatus operating a pointer for selecting a target object from a plurality of target objects displayed on a screen, the input apparatus comprising:
- a first operation section to input first movement information for moving the pointer on the screen;
- a second operation section to input movement restriction information for moving, when the pointer is indicating a predetermined area around the target object on the screen, the pointer such that the pointer indicates the target object and restricting the movement of the pointer at the predetermined area, and restricting, when the pointer is indicating the target object, the movement of the pointer from the target object to outside the target object such that the pointer a movement recognition function of the first operation section is ineffective to move the pointer to outside the target object;
- a third operation section to input execution information for executing the target object indicated by the pointer on the screen; and
- a fourth operation section to input second movement information for, when the movement of the pointer has been restricted and is stopped while indicating the target object on the screen, moving the pointer from the target object indicated by the pointer to another target object in a predetermined order configured to only cycle through the target objects in a stepwise fashion.

14. An information processing system comprising:
- a display apparatus to display on a screen a plurality of target objects and a pointer for selecting a target object from the plurality of target objects;
- an input apparatus including a first operation section to input first movement information for moving the pointer on the screen, a second operation section to input movement restriction information for moving, when the pointer is indicating a predetermined area around the target object on the screen, the pointer such that the pointer indicates the target object, and restricting the movement of the pointer at the predetermined area such that the pointer is stopped and a movement recognition function of the first operation section is ineffective to move the pointer, a third operation section to input execution information for executing the target object indicated by the pointer on the screen, and a fourth operation section to input second movement information for, when the movement of the pointer has been restricted and is stopped while indicating the target object on the screen, moving the pointer from the target object indicated by the pointer to another target object in a predetermined order configured to only cycle through the target objects in a stepwise fashion; and
- an information processing apparatus including a receiver device to input the first movement information, the movement restriction information, the second movement information, and the execution information, and a microprocessor to perform movement control of the pointer and execution control of the target object based on the first movement information, the movement restriction information, the second movement information, and the execution information input by the receiver device.

15. The information processing system according to claim 14,
wherein the input apparatus is a 3-dimensional pointing device.

16. An information processing method comprising:
- displaying on a screen a plurality of target objects and a pointer for selecting a target object from the plurality of target objects;
- moving, with a microprocessor, the pointer on the screen;
- moving, with the microprocessor, when the pointer is indicating a predetermined area around the target object on the screen, the pointer such that the pointer indicates the target object, restricting the movement of the pointer at the predetermined area such that the pointer is stopped and a movement recognition function of an input apparatus is ineffective to move the pointer, and when the movement of the pointer has been restricted and is stopped while indicating the target object on the screen, moving the pointer from the target object indicated by the pointer to another target object in a predetermined order configured to only cycle through the target objects in a stepwise fashion; and
- executing, with the microprocessor, the target object indicated by the pointer on the screen.

17. An information processing method comprising:
- displaying on a screen a plurality of target objects and a pointer for selecting a target object from the plurality of target objects;
- moving, with a processor, the pointer on the screen;
- moving, with the processor, when the pointer is indicating a predetermined area around the target object on the screen, the pointer such that the pointer indicates the target object, and restricting the movement of the pointer at the predetermined area;

restricting, with the processor, when the pointer is indicating the target object, the movement of the pointer from the target object to outside the target object such that the pointer is stopped and a movement recognition function is ineffective to move the pointer outside the target object;

when the movement of the pointer has been restricted and is stopped while indicating the target object on the screen, moving the pointer from the target object indicated by the pointer to another target object in a predetermined order configured to only cycle through the target objects in a stepwise fashion; and executing, with the processor, the target object indicated by the pointer on the screen.

18. A non-transitory computer readable storage medium storing a computer program including executable instructions that when executed by a processor perform steps for causing an information processing apparatus to execute:

displaying on a screen a plurality of target objects and a pointer for selecting a target object from the plurality of target objects;

moving the pointer on the screen;

moving, when the pointer is indicating a predetermined area around the target object on the screen, the pointer such that the pointer indicates the target object, restricting the movement of the pointer at the predetermined area such that the pointer is stopped and a movement recognition function of the information processing apparatus is ineffective to move the pointer, and when the movement of the pointer has been restricted and is stopped while indicating the target object on the screen, moving the pointer from the target object indicated by the pointer to another target object in a predetermined order configured to only cycle through the target objects in a stepwise fashion; and executing the target object indicated by the pointer on the screen.

19. The information processing apparatus according to claim 1, wherein when the pointer is indicating a predetermined area around the target object on the screen, the target object is displayed with emphasis.

20. An information processing apparatus comprising:

a receiver device to input movement information for moving on a screen a pointer for selecting a target object from a plurality of target objects displayed on the screen;

a microprocessor to control the movement of the pointer on the screen based on the movement information input by the receiver device; and a video RAM to control display of the screen such that, when the pointer is indicating a predetermined area around the target object on the screen, the entire target object is moved in a direction toward a position of the pointer such that a first coordinate position inside the target object is positioned at a second coordinate position of the pointer in a way that the pointer overlaps the target object.

21. The information processing apparatus according to claim 1, wherein when the pointer is indicating the predetermined area around the target object on the screen and the movement restriction information is input, the pointer is moved to indicate the target object independent of the first movement information.

22. The information processing apparatus according to claim 1, wherein the first movement information is ineffective to move the pointer on the screen when the movement restriction information is input.

23. The information processing apparatus according to claim 1, wherein an input apparatus includes a button for inputting the movement restriction information that moves the pointer from the predetermined area around the target object to the target object, and switches the effectiveness or ineffectiveness of the movement recognition function.

* * * * *